(12) United States Patent
Ota

(10) Patent No.: US 11,694,348 B2
(45) Date of Patent: Jul. 4, 2023

(54) CONTROL METHOD FOR IMAGE PROJECTION SYSTEM AND IMAGE PROJECTION SYSTEM

(71) Applicant: SEIKO EPSON CORPORATION, Tokyo (JP)

(72) Inventor: Akihiko Ota, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 381 days.

(21) Appl. No.: 16/940,493

(22) Filed: Jul. 28, 2020

(65) Prior Publication Data
US 2021/0035315 A1   Feb. 4, 2021

(30) Foreign Application Priority Data

Jul. 29, 2019 (JP) ................................. 2019-138617

(51) Int. Cl.
*H04N 9/31* (2006.01)
*G06T 7/33* (2017.01)
*G06T 3/40* (2006.01)

(52) U.S. Cl.
CPC ............ *G06T 7/337* (2017.01); *G06T 3/4038* (2013.01); *H04N 9/3147* (2013.01); *H04N 9/3182* (2013.01)

(58) Field of Classification Search
CPC ...... H04N 9/3147; H04N 9/3182; H04N 9/74; H04N 9/31; G06T 7/337; G06T 3/4038

USPC .................................. 348/744, 584; 382/294
See application file for complete search history.

(56) References Cited

U.S. PATENT DOCUMENTS

| | | | |
|---|---|---|---|
| 6,932,481 B2* | 8/2005 | Koyama | H04N 9/3147 348/E5.103 |
| 8,511,830 B2 | 8/2013 | Kotani | |
| 9,292,945 B2* | 3/2016 | Kubota | G06T 11/003 |
| 10,009,583 B2* | 6/2018 | Ito | H04N 9/3147 |
| 2017/0223320 A1 | 8/2017 | Hiranuma | |

FOREIGN PATENT DOCUMENTS

| | | |
|---|---|---|
| JP | 2011-215485 A | 10/2011 |
| JP | 2014-107713 A | 6/2014 |
| JP | 2017-138581 A | 8/2017 |

* cited by examiner

*Primary Examiner* — Trang U Tran
(74) *Attorney, Agent, or Firm* — Dority & Manning, P.A.

(57) ABSTRACT

A range of images projected by a first projector group and a range of images projected by a second projector group are set to coincide with each other. A first setting screen including a first region for setting positions of images projected by a respective plurality of projectors included in the first projector group and a second region for setting positions of images projected by a respective plurality of projectors included in the second projector group is displayed. Operation by a user on the first setting screen is received. The positions of the images projected by the respective plurality of projectors included in the first projector group and the positions of the images projected by the respective plurality of projectors included in the second projector group are set.

18 Claims, 11 Drawing Sheets

CONTROL METHOD FOR IMAGE PROJECTION SYSTEM AND IMAGE PROJECTION SYSTEM

The present application is based on, and claims priority from JP Application Serial Number 2019-138617, filed Jul. 29, 2019, the disclosure of which is hereby incorporated by reference herein in its entirety.

BACKGROUND

1. Technical Field

The present disclosure relates to a control method for an image projection system and the image projection system.

2. Related Art

There has been known a technique concerning an operation method for setting screen positions of a plurality of projectors configuring a multi-projection system (see, for example, JP-A-2014-107713 (Patent Literature 1)).

In the operation method for the plurality of projectors configuring the multi-projection system described in Patent Literature 1, a setting screen including a plurality of setting regions arranged in a grid shape imitating a projection state by the plurality of projectors is displayed. A user drags and drops an icon imitating a projector toward any one of the plurality of setting regions to associate a projection region corresponding to the setting region and device information of the projector associated with the icon.

When performing stack projection for superimposing projection regions of a plurality of projectors while executing multi-projection, in order to suppress unevenness from occurring in a formed multi-projection screen in multi-projection display in respective layers among a plurality of layers forming the stack projection, it is preferable to dispose projectors of the same model or projectors having the same function.

However, it is likely that it takes time for the user to determine the disposition of the projectors with the method described in Patent Literature 1 in the respective layers among the plurality of layers forming the stack projection. That is, for example, when two projectors disposed in layers different from each other are replaced, the user needs to, for example, switch a screen. Further, the user needs to switch the screen and confirm presence or absence of projectors that can be replaced.

SUMMARY

An aspect is directed to a control method for an image projection system including a first projector group and a second projector group, a range of images projected by the first projector group and a range of images projected by the second projector group being set to coincide with each other, the control method for the image projection system including: displaying a first setting screen including a first region for setting positions of images projected by a respective plurality of projectors included in the first projector group and a second region for setting positions of images projected by a respective plurality of projectors included in the second projector group; and receiving operation by a user on the first setting screen and setting the positions of the images projected by the respective plurality of projectors included in the first projector group and the positions of the images projected by the respective plurality of projectors included in the second projector group.

In the control method for an image projection system, the first setting screen may include a first display region for displaying identification information indicating a respective communicably coupled plurality of projectors, and the control method for the image projection system may further include receiving operation by the user on the first display region and selecting, from the plurality of projectors displayed in the first display region, the respective plurality of projectors included in the first projector group and the respective plurality of projectors included in the second projector group.

In the control method for an image projection system, the first setting screen may include a second display region for displaying a first function executable by the plurality of projectors included in the first projector group and displaying the first function executable by the plurality of projectors included in the second projector group.

In the control method for an image projection system, the first function may include at least one of a screen matching function and a tiling assist function, the screen matching function may indicate a function of adjusting a tint and brightness of images displayed adjacent to each other among images projected by the respective plurality of projectors included in the first projector group or the second projector group, and the tiling assist function may indicate a function of adjusting sizes and positions of the images projected by the respective plurality of projectors included in the first projector group or the second projector group.

In the control method for an image projection system, the first setting screen may include a third display region for displaying a second function executable by one projector among the plurality of projectors included in the first projector group and another one projector, which projects an image over an image projected by the one projector, among the plurality of projectors included in the second projector group.

In the control method for an image projection system, the second function may include a stacking assist function, and the stacking assist function may indicate a function of aligning positions of pixels forming the image projected by the one projector and positions of pixels forming the image projected by the other one projector.

In the control method for an image projection system, the control method for the image projection system may further include displaying a second setting screen for receiving, for the plurality of projectors included in the first projector group or the plurality of projectors included in the second projector group, at least one operation among operation for opening or closing a shutter, operation for turning on and off a power supply, and operation for selecting one input terminal from a plurality of input terminals.

Another aspect is directed to an image projection system including a first projector group and a second projector group, a range of images projected by the first projector group and a range of images projected by the second projector group being set to coincide with each other, the image projection system including: a display control section configured to display a first setting screen including a first region for setting positions of images projected by a respective plurality of projectors included in the first projector group and a second region for setting positions of images projected by a respective plurality of projectors included in the second projector group; and a setting section configured to receive operation by a user on the first setting screen and set the positions of the images projected by the respective plurality of projectors included in the first projector group and the positions of the images projected by the respective plurality of projectors included in the second projector group.

DESCRIPTION OF EXEMPLARY EMBODIMENTS

An embodiment is explained below with reference to the drawings.

Figure 1:
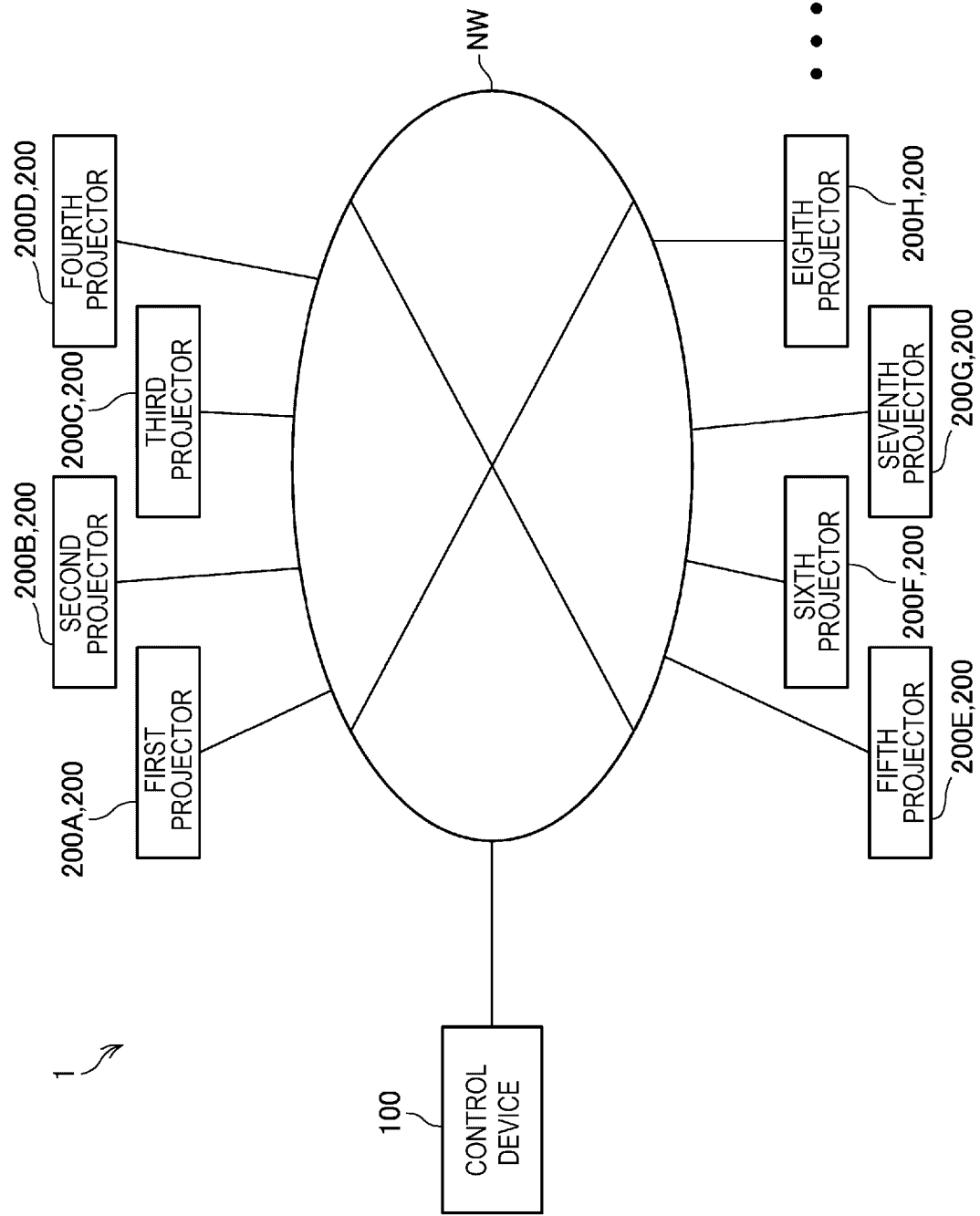
FIG. 1 is a diagram showing an example of the configuration of an image projection system.

1. Configuration of an Image Projection System 1-1. Overall Configuration of the Image Projection System FIG. 1 is a diagram showing an example of the configuration of an image projection system 1.

The image projection system 1 in this embodiment includes a control device 100 and a plurality of projectors 200. The control device 100 and the respective plurality of projectors 200 are communicably coupled via a network NW. The network NW is, for example, a LAN (Local Area Network). Communication is executed according to the Ethernet (registered trademark) standard.

The image projection system 1 includes, as the plurality of projectors 200, a first projector 200A, a second projector 200B, a third projector 200C, a fourth projector 200D, a fifth projector 200E, a sixth projector 200F, a seventh projector 200G, and an eighth projector 200H.

The respective first to eighth projectors 200A to 200H have substantially the same configurations.

In the following explanation, when it is not particularly necessary to distinguish the respective first to eighth projectors 200A to 200H, the first to eighth projectors 200A to 200H are sometimes described as projectors 200.

The control device 100 controls the positions of images projected by the respective first to eighth projectors 200A to 200H. For example, the control device 100 divides the first to eighth projectors 200A to 200H into four projectors included in a first projector group G1 and four projectors included in a second projector group G2. A range of images projected by the first projector group G1 and a range of images projected by the second projector group G2 are set to coincide with each other. That is, the images projected by the first projector group G1 and the images projected by the second projector group G2 are superimposed. In other words, stack projection of the images projected by the first projector group G1 and the images projected by the second projector group G2 is performed.

The control device 100 receives operation by a user and sets positions of images projected by respective four projectors 200 included in the first projector group G1 and positions of images projected by respective four projectors 200 included in the second projector group G2.

The configuration of the control device 100 is explained in detail below with reference to FIGS. 2 and 4.

In this embodiment, the control device 100 controls the positions of the images projected by the respective first to eighth projectors 200A to 200H. However, the present disclosure is not limited to this. For example, a second control section 250 of the first projector 200A explained below with reference to FIG. 3 may control the positions of the images projected by the respective first to eighth projectors 200A to 200H.

In this embodiment, the first projector 200A is coupled to the respective second to eighth projectors 200B to 200H via the network NW. However, the first projector 200A may be daisy chain-coupled to the respective second to eighth projectors 200B to 200H. For example, the first projector 200A is USB (Universal Serial Bus)-coupled to the second projector 200B. The second projector 200B is USB-coupled to the third projector 200C. The third projector 200C is USB-coupled to the fourth projector 200D. The fourth projector 200D is USB-coupled to the fifth projector 200E. The fifth projector 200E is USB-coupled to the sixth projector 200F. The sixth projector 200F is USB-coupled to the seventh projector 200G. The seventh projector 200G is USB-coupled to the eighth projector 200H.

The first projector 200A may be configured to be wirelessly communicable with the respective second to eighth projectors 200B to 200H according to the Wi-Fi (registered trademark) standard or the like.

1-2. Configuration of the Control Device

Figure 2:
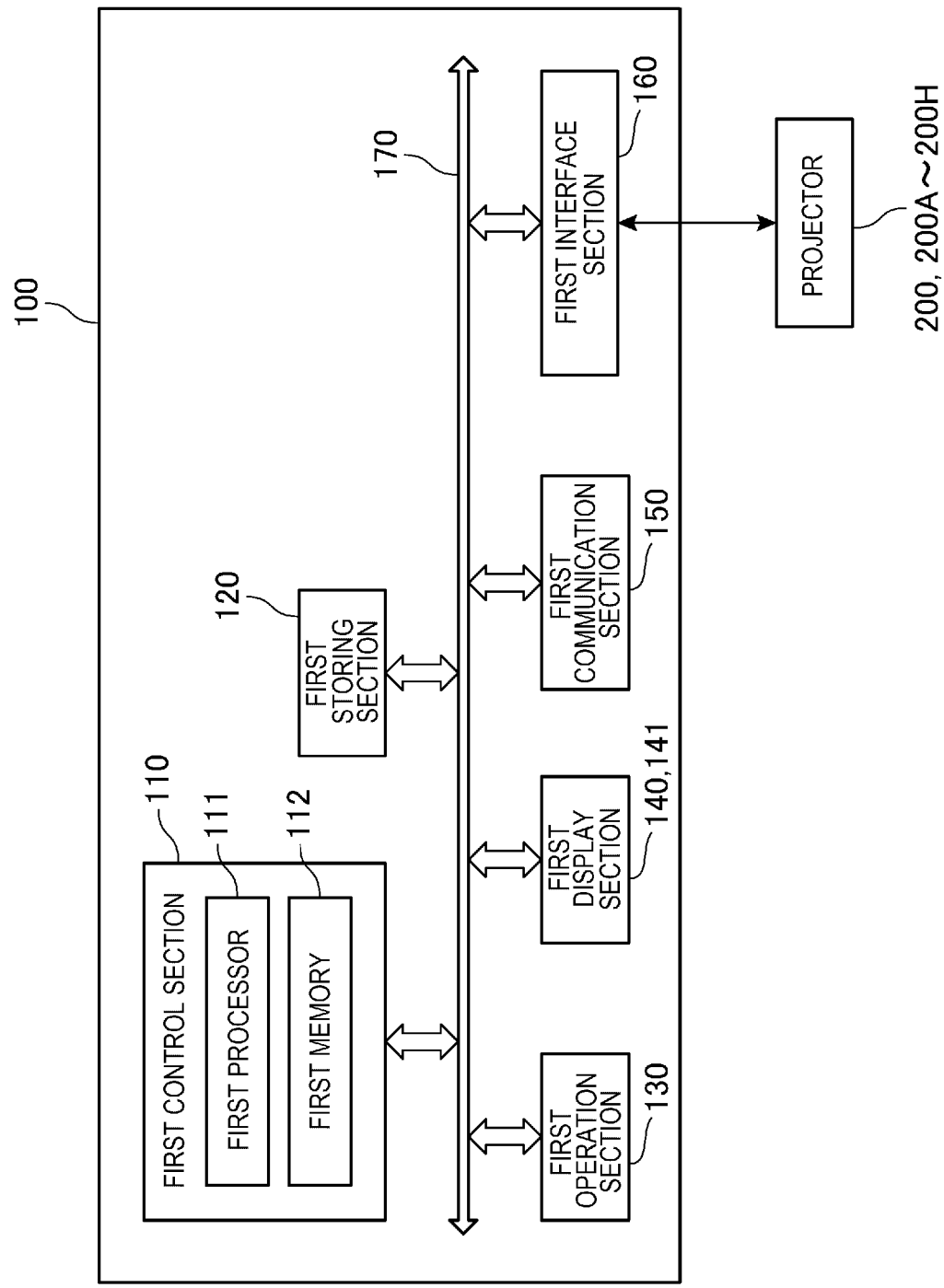
FIG. 2 is a diagram showing an example of the configuration of a control device.

FIG. 2 is a diagram showing an example of the configuration of the control device 100.

The control device 100 is communicably coupled to the projectors 200 and transmits various kinds of setting information and various kinds of instruction information to the projectors 200. In this embodiment, the control device 100 is communicably coupled to the projectors 200 via the network NW.

The control device 100 is configured by, for example, a personal computer and includes a first control section 110, a first storing section 120, a first operation section 130, a first display section 140, a first communication section 150, and a first interface section 160.

The first storing section 120, the first operation section 130, the first display section 140, the first communication section 150, and the first interface section 160 are coupled to the first control section 110 by a first internal bus 170.

The first control section 110 includes a first processor 111 and a first memory 112 and controls the sections of the control device 100.

The first memory 112 is a storage device that stores, in a nonvolatile manner, programs to be executed by the first processor 111 and data to be processed by the first processor 111. The first memory 112 is configured by a magnetic storage device, a semiconductor storage element such as a flash ROM (Read Only Memory), or a nonvolatile storage device of another type. The first memory 112 may include a RAM (Random Access Memory) configuring a work area of the first processor 111. The first memory 112 stores data to be processed by the first control section 110 and a first control program to be executed by the first processor 111.

The first processor 111 may be configured by a single processor. A plurality of processors may be configured to function as the first processor 111. The first processor 111 executes the first control program and controls the sections of the control device 100.

The first storing section 120 stores, in a nonvolatile manner, programs to be executed by the first control section 110 and data to be processed by the first control section 110. The first storing section 120 is, for example, a magnetic recording device such as a HDD (Hard Disk Drive) or a storage device including a semiconductor storage element such as a flash memory.

The first storing section 120 stores an operating system (OS) functioning as a basic control program to be executed by the first control section 110, application programs operating using the OS as a platform, and the like. The first storing section 120 stores data to be processed during execution of the application programs, data of processing results, and the like.

The operation section 130 receives operation from the user, generates an operation signal, and outputs the operation signal to the first control section 110. The first operation section 130 includes, for example, a keyboard and a mouse.

The first display section 140 includes a display panel 141 that displays various images according to the control by the first control section 110. The display panel 141 includes, for example, an LCD (Liquid Crystal Display). The display panel 141 is configured in a rectangular shape. In this embodiment, the display panel 141 has an oblong shape.

In this embodiment, the display panel 141 is configured as a touch panel. That is, a touch sensor that detects a position touched by a pen, a finger of the user, or the like on the display panel 141 is disposed on the display panel 141.

In the following explanation in this embodiment, the display panel 141 receives operation from the user.

The first communication section 150 is a communication interface that executes data communication with external devices including the projectors 200. The first communication section 150 includes an interface circuit that processes signals to be transmitted and received. The first communication section 150 is, for example, a wireless communication interface adapted to the Wi-Fi (registered trademark) standard.

The first interface section 160 is an interface coupled to an external device. The interface section 160 executes, for example, communication conforming to the Ethernet (registered trademark) standard. The first interface section 160 includes a connector that couples an Ethernet (registered trademark) cable and an interface circuit that processes a signal transmitted through the connector. The first interface section 160 is an interface substrate including the connector and the interface circuit. The first interface section 160 is coupled to a main substrate on which, for example, the processor of the first control section 110 is mounted. Alternatively, the connector and the interface circuit configuring the first interface section 160 are mounted on the main substrate of the control device 100.

In this embodiment, the first control section 110 transmits various kinds of setting information and various kinds of instruction information to the projectors 200 via the first interface section 160. However, the first control section 110 may transmit the various kinds of setting information and the various kinds of instruction information to the projectors 200 via the first communication section 150. In other words, in this embodiment, the first control section 110 transmits the various kinds of setting information and the various kinds of instruction information to the projectors 200 through wired communication. However, the first control section 110 may transmit the various kinds of setting information and the various kinds of instruction information to the projectors 200 through wireless communication.

In this embodiment, the control device 100 is configured by the personal computer. However, the control device 100 may be configured by a tablet terminal, a smartphone, or the like.

1-3. Configuration of the Projector

Figure 3:
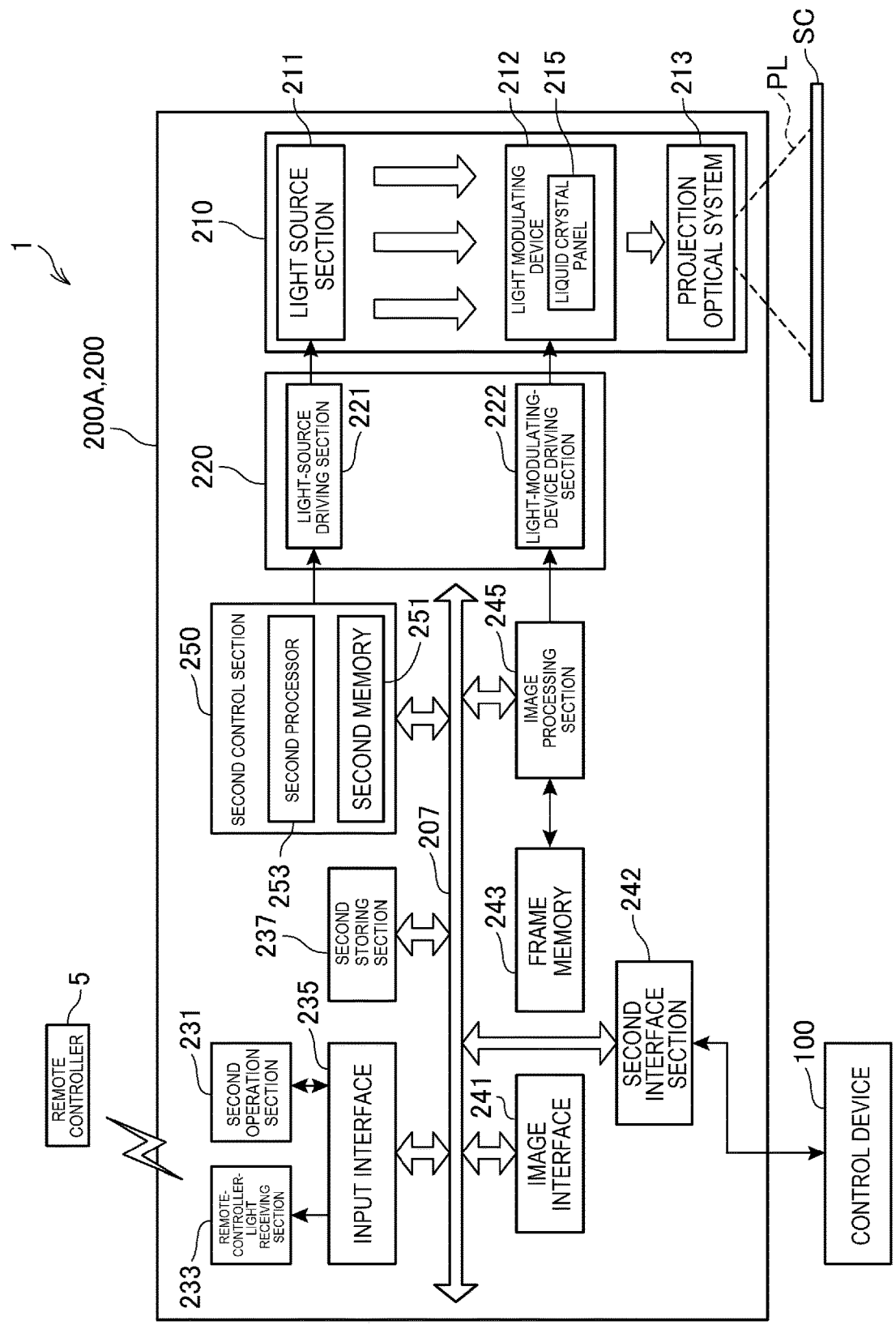
FIG. 3 is a diagram showing an example of the configuration of a first projector.

FIG. 3 is a diagram showing an example of the configuration of the first projector 200A.

Since the respective first to eighth projectors 200A to 200H have substantially the same configuration, the configuration of the first projector 200A is explained with reference to FIG. 3. Explanation about the respective second to eighth projectors 200B to 200H is omitted.

The first projector 200A includes a projecting section 210 and a driving section 220 that drives the projecting section 210. The projecting section 210 forms an optical image and projects the image onto a screen SC.

The projecting section 210 includes a light source section 211, a light modulating device 212, and a projection optical system 213. The driving section 220 includes a light-source driving section 221 and a light-modulating-device driving section 222.

The light source section 211 includes a lamp such as a halogen lamp, a Xenon lamp, or an ultrahigh pressure mercury lamp or a solid-state light source such as an LED (Light Emitting Diode) or a laser light source.

The light source section 211 may include a reflector that guides light emitted by a light source to the light modulating device 212 and an auxiliary reflector. Further, the light source section 211 may include a lens group and a polarizing plate for improving an optical characteristic of projected light or a dimming element that reduces a light amount of the light emitted by the light source on a path leading to the light modulating device 212.

The light-source driving section 221 is coupled to a second internal bus 207 and lights and extinguishes the light source of the light source section 211 according to an instruction of the second control section 250 coupled to the second internal bus 207.

The light modulating device 212 includes, for example, a three liquid crystal panels 215 corresponding to the three primary colors of R, G, and B. R indicates red, G indicates green, and B indicates blue. That is, the light modulating device 212 includes the liquid crystal panel 215 corresponding to R color light, the liquid crystal panel 215 corresponding to G color light, and the liquid crystal panel 215 corresponding to B color light.

Light emitted by the light source section 211 is separated into color lights of the three colors of R, G, and B. The color lights are respectively made incident on the liquid crystal panels 215 corresponding thereto. The respective three liquid crystal panels 215 are transmissive liquid crystal panels and modulate lights transmitted therethrough to generate image lights PL. The image lights PL passed through the liquid crystal panels 215 and modulated are combined by a combination optical system such as a cross dichroic prism and emitted to the projection optical system 213.

In the following explanation in this embodiment, the light modulating device 212 includes the transmissive liquid crystal panels 215 as light modulating elements. However, this embodiment is not limited to this. The light modulating elements may be reflective liquid crystal panels or may be digital micromirror devices.

The light modulating device 212 is driven by the light-modulating-device driving section 222. The light-modulating-device driving section 222 is coupled to an image processing section 245.

Image data corresponding to the primary colors of R, G, and B are input to the light-modulating-device driving section 222 from the image processing section 245. The light-modulating-device driving section 222 converts the input image data into data signals suitable for the operation of the liquid crystal panels 215. The light-modulating-device driving section 222 applies voltages to pixels of the liquid crystal panels 215 based on the converted data signals and draws images on the liquid crystal panels 215.

The projection optical system 213 includes a lens, a mirror, and the like that focus the incident image lights PL on the screen SC. The projection optical system 213 may include a zoom mechanism for enlarging or reducing an image projected onto the screen SC and a focus adjusting mechanism for performing adjustment of a focus.

The projector 200 further includes a second operation section 231, a remote-controller-light receiving section 233, an input interface 235, a second storing section 237, an image interface 241, a second interface section 242, a frame memory 243, the image processing section 245, and the second control section 250. The input interface 235, the second storing section 237, the image interface 241, the second interface section 242, the image processing section 245, and the second control section 250 are coupled to one another via the second internal bus 207 to be capable of performing data communication.

The second operation section 231 includes various buttons and switches provided on a housing surface of the projector 200. The second operation section 231 generates operation signals corresponding to operation of the buttons and the switches and outputs the operation signals to the input interface 235. The input interface 235 includes a circuit that outputs the operation signals input from the second operation section 231 to the second control section 250.

The remote-controller-light receiving section 233 receives an infrared signal transmitted from a remote controller 5 and decodes the received infrared signal to generate an operation signal. The remote-controller-light receiving section 233 outputs the generated operation signal to the input interface 235. The input interface 235 includes a circuit that outputs the operation signal input from the remote-controller-light receiving section 233 to the second control section 250.

The second storing section 237 is, for example, a nonvolatile storage device such as a hard disk drive or an SSD (Solid State Drive). The second storing section 237 stores programs to be executed by the second control section 250 and data, image data, and the like processed by the second control section 250.

The image interface 241 includes a connector and an interface circuit. The image interface 241 is configured to be couplable to, by wire, a not-shown image supply device that supplies image data to the projector 200.

The second interface section 242 is a communication interface that executes communication with the control device 100 according to the Ethernet (registered trademark) standard. The second interface section 242 includes a connector that couples an Ethernet (registered trademark) cable and an interface circuit that processes a signal transmitted through the connector. The second interface section 242 is an interface substrate including a connector and an interface circuit. The second interface section 242 is coupled to a main substrate on which, for example, a second processor 253 of the second control section 250 is mounted. Alternatively, the connector and the interface circuit configuring the second interface section 242 are mounted on the main substrate of the second control section 250. The second interface section 242 receives, for example, various kinds of setting information and various kinds of instruction information from the control device 100.

The second control section 250 includes a second memory 251 and a second processor 253.

The second memory 251 is a storage device that stores, in a nonvolatile manner, programs to be executed by the second processor 253 and data to be processed by the second processor 253. The second memory 251 is configured by a magnetic storage device, a semiconductor storage element such as a flash ROM, or a nonvolatile storage device of another type. The second memory 251 may include a RAM configuring a work area of the second processor 253. The second memory 251 stores data to be processed by the second control section 250 and a second control program to be executed by the second processor 253.

The second processor 253 may be configured by a single processor. A plurality of processors may function as the second processor 253. The second processor 253 executes the second control program and controls the sections of the projector 200. For example, the second processor 253 outputs, to the image processing section 245, an execution instruction for image processing corresponding to operation received by the second operation section 231 or the remote controller 5 and parameters used for the image processing. The parameters include, for example, a geometric correction parameter for correcting geometric distortion of an image projected onto the screen SC. The second processor 253 controls the light-source driving section 221 to control lighting and extinction of the light source section 211 and adjusts the luminance of the light source section 211.

The image processing section 245 and the frame memory 243 can be configured by, for example, an integrated circuit. The integrated circuit includes an LSI, an ASIC (Application Specific Integrated Circuit), and a PLD (Programmable Logic Device). The PLD includes, for example, an FPGA (Field-Programmable Gate Array). An analog circuit may be included in a part of the configuration of the integrated circuit. The image processing section 245 and the frame memory 243 may be a combination of a processor and an integrated circuit. The combination of the processor and the integrated circuit is called microcontroller (MCU), SoC (System-on-a-chip), system LSI, chip set, and the like.

The image processing section 245 develops, on the frame memory 243, image data input from the image interface 241. The frame memory 243 includes a plurality of banks. The banks have a storage capacity for enabling writing of image data for one frame. The frame memory 243 is configured by, for example, an SDRAM (Synchronous Dynamic Random Access Memory).

The image processing section 245 performs, on the image data developed on the frame memory 243, for example, image processing such as resolution conversion processing or resize processing, correction of distortion aberration, shape correction processing, digital zoom processing, and adjustment of a tint and luminance of an image.

The image processing section 245 generates a vertical synchronization signal obtained by converting an input frame frequency of a vertical synchronization signal into a drawing frequency. The generated vertical synchronization signal is referred to as output synchronization signal. The image processing section 245 outputs the generated output synchronization signal to the light-modulating-device driving section 222.

1-4. Configuration of the First Control Section

Figure 4:
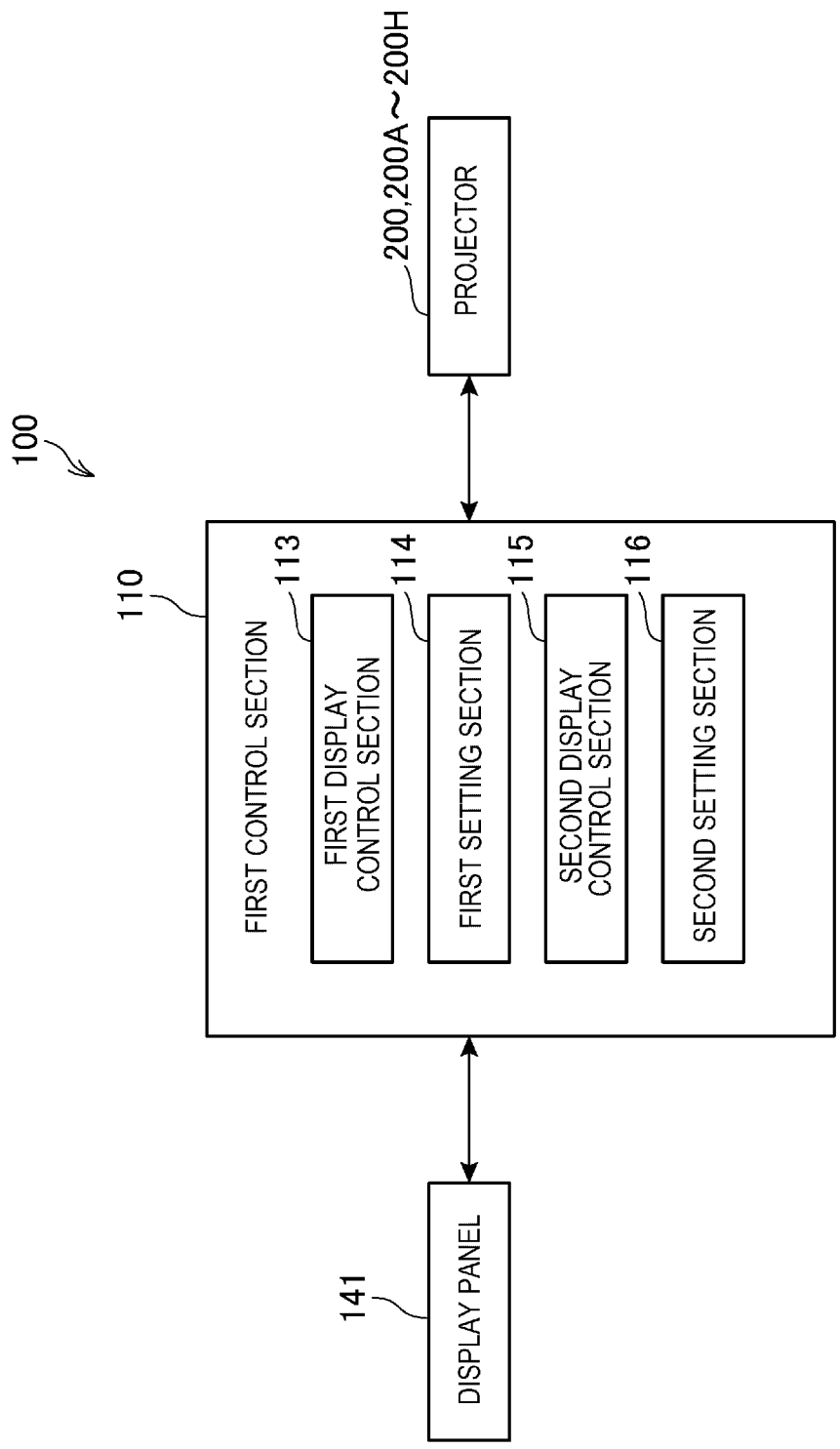
FIG. 4 is a diagram showing an example of the configuration of a first control section of the control device.

FIG. 4 is a diagram showing an example of the configuration of the first control section 110 of the control device 100.

The first control section 110 of the control device 100 includes a first display control section 113, a first setting section 114, a second display control section 115, and a second setting section 116. Specifically, the first processor 111 of the first control section 110 executes the first control program stored in the first memory 112 to thereby function as the first display control section 113, the first setting section 114, the second display control section 115, and the second setting section 116.

The first display control section 113 displays a first setting screen 300 on the display panel 141. The first setting screen 300 includes a first region 350 for setting positions of images projected by the respective four projectors 200 included in the first projector group G1 and a second region 360 for setting positions of images projected by the respective four projectors 200 included in the second projector group G2. The first display control section 113 corresponds to an example of a "display control section".

The first setting screen 300 is explained in detail below with reference to FIGS. 5 to 7. The "four projectors 200" corresponds to an example of a "plurality of projectors".

The first setting section 114 receives operation by the user on the first setting screen 300 and sets positions of images projected by the respective four projectors 200 included in the first projector group G1 and positions of images projected by the respective four projectors 200 included in the second projector group G2. The first setting section 114 corresponds to an example of a "setting section".

The second display control section 115 displays a second setting screen 500 on the display panel 141. The second setting screen 500 receives first operation QP1, second operation QP2, and third operation QP3 for the four projectors 200 included in the first projector group G1 or the four projectors 200 included in the second projector group G2. The first operation QP1 indicates operation for opening or closing a shutter. The second operation QP2 indicates operation for turning on or off a power supply. The third operation QP3 indicates operation for selecting one input terminal from a plurality of input terminals.

The second setting screen 500 is explained in detail below with reference to FIG. 10.

The second setting section 116 transmits instruction information corresponding to operation received via the second setting screen 500 to the four projectors 200 included in the first projector group G1 or the four projectors 200 included in the second projector group G2.

2. Configuration of the First Setting Screen

Figure 5:
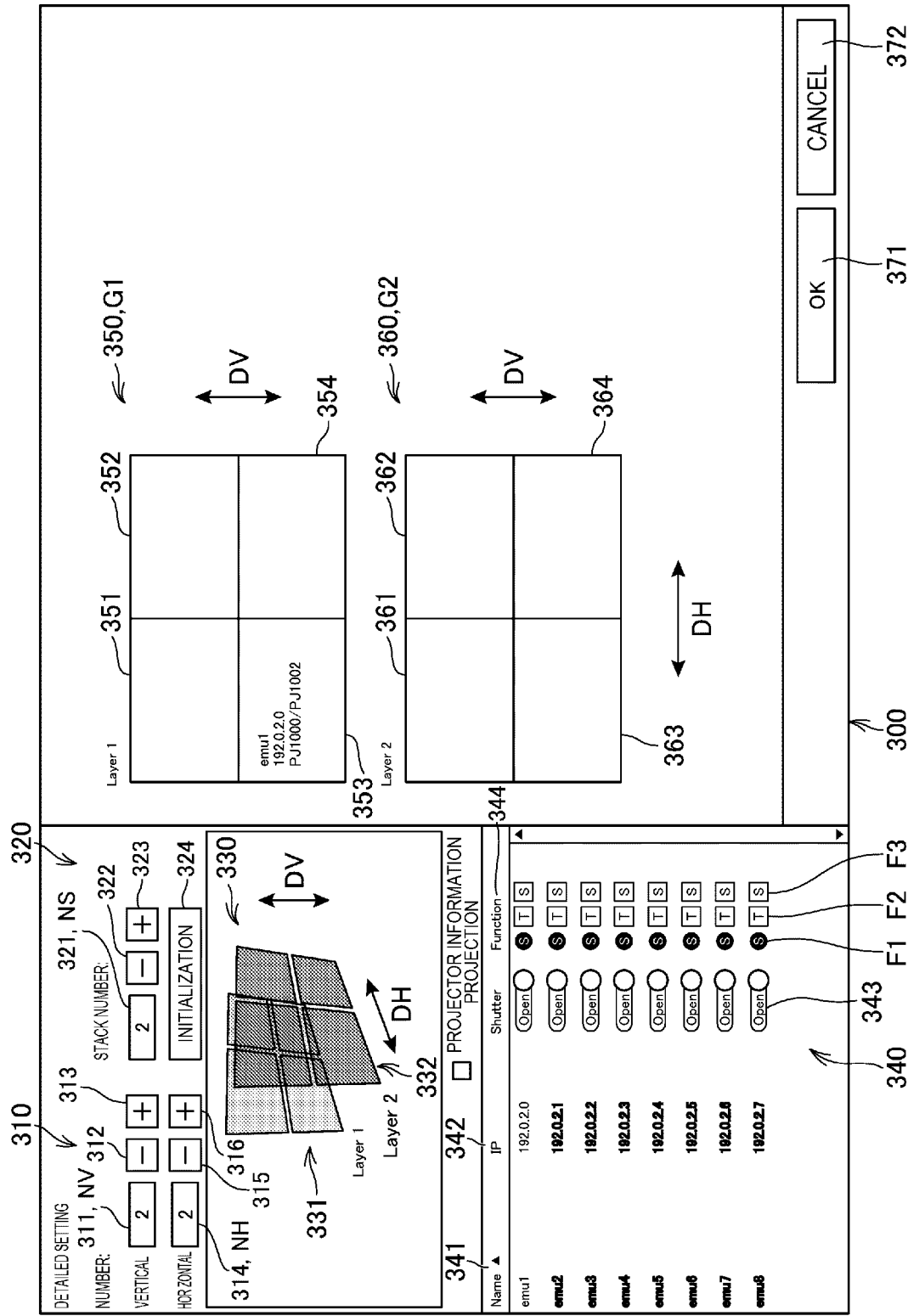
FIG. 5 is a screen diagram showing an example of a first setting screen displayed on a display panel.
Figure 6:
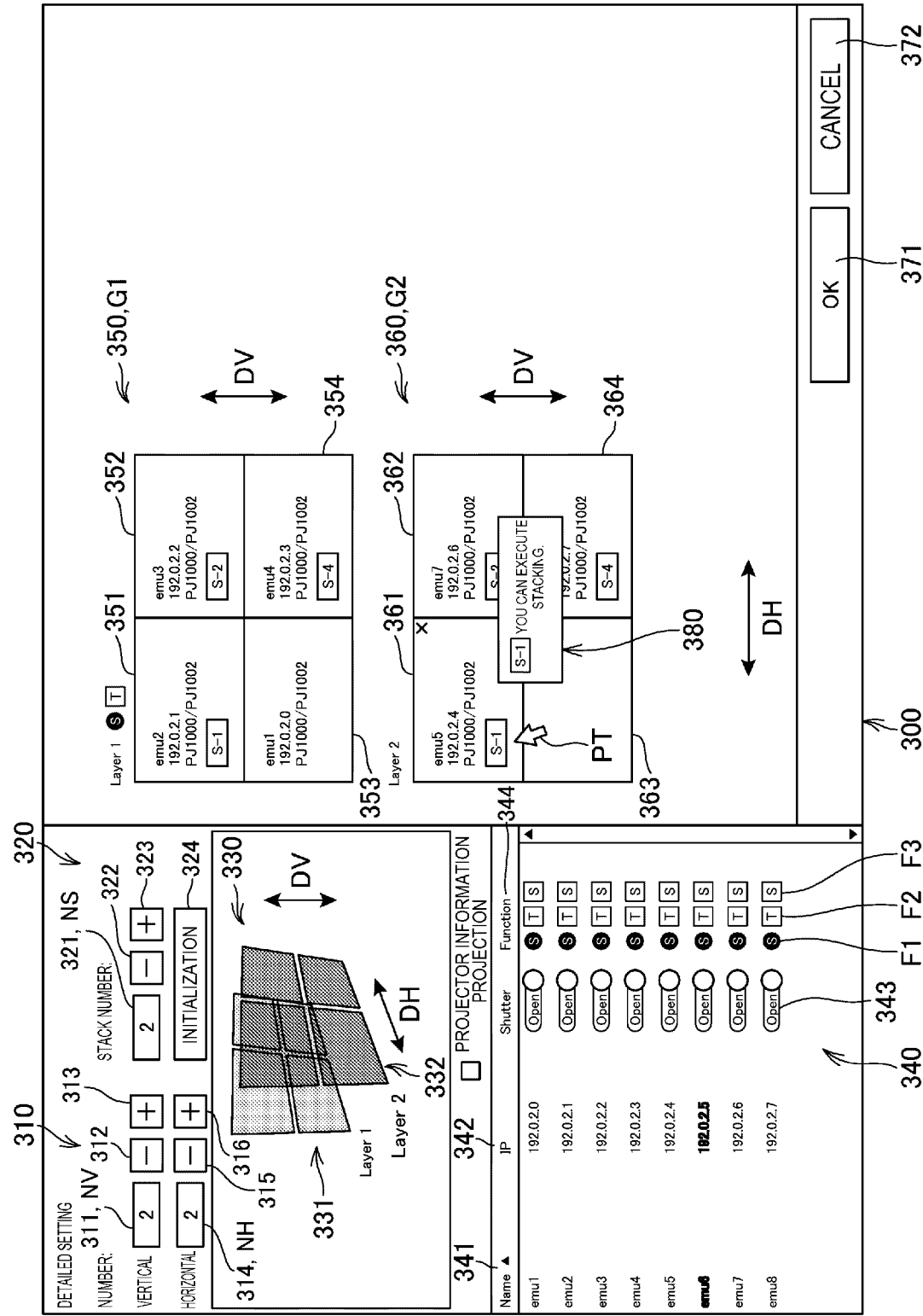
FIG. 6 is a screen diagram showing another example of the first setting screen displayed on the display panel.
Figure 7:
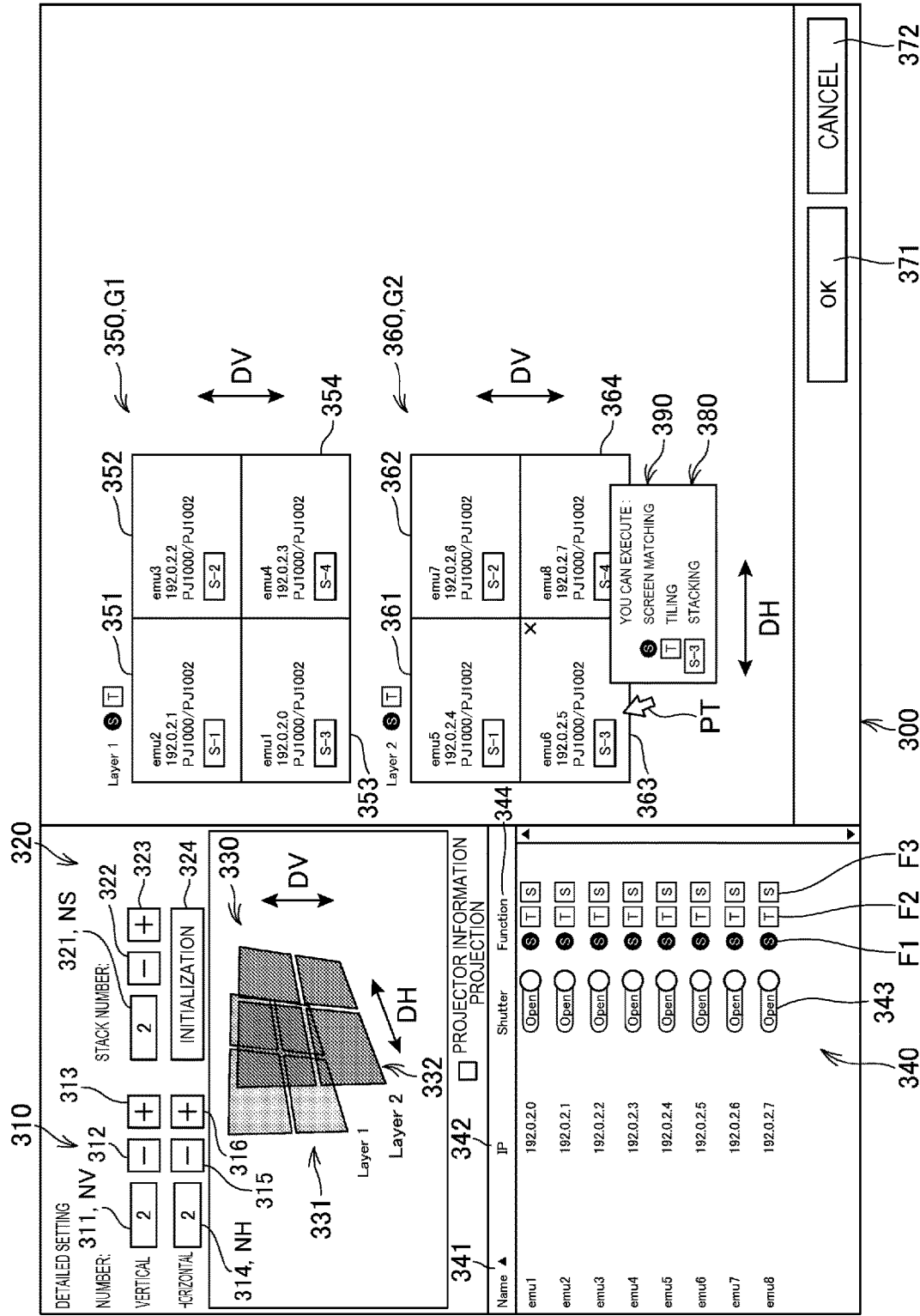
FIG. 7 is a screen diagram showing still another example of the first setting screen displayed on the display panel.

FIGS. 5 to 7 are screen diagrams showing examples of the first setting screen 300 displayed on the display panel 141.

As shown in FIG. 5, a number setting section 310, a stack-number setting section 320, an image display section 330, a list display section 340, a first region 350, a second region 360, an OK button 371, and a cancel button 372 are displayed on the first setting screen 300.

The number setting section 310 includes a vertical-direction-number display section 311 and a horizontal-direction-number display section 314. A vertical direction number NV is displayed in the vertical-direction-number display section 311. A horizontal direction number NH is displayed in the horizontal-direction-number display section 314.

The vertical direction number NV indicates, in the plurality of projectors 200 included in the first projector group G1 or the second projector group G2, the number of images projected from the projectors 200 and arrayed in an up-down direction DV. The horizontal direction number NH indicates, in the plurality of projectors 200 included in the first projector group G1 or the second projector group G2, the number of images projected from the projectors 200 and arrayed in a left-right direction DH.

"2" displayed in the vertical-direction-number display section 311 indicates that the vertical direction number NV is "2". "2" displayed in the horizontal-direction-number display section 314 indicates that the lateral direction number NH is "2". In this case, the number of the projectors 200 included each of the first projector group G1 and the second projector group G2 is four (=2×2).

The number setting section 310 includes a reduction button 312, an increase button 313, a reduction button 315, and an increase button 316.

The reduction button 312 is touched by the user when reducing the vertical direction number NV. The increase button 313 is touched by the user when increasing the vertical direction number NV. The reduction button 315 is touched by the user when reducing the horizontal direction number NH. The increase button 316 is touched by the user when increasing the horizontal direction number NH.

The stack-number setting section 320 includes a stack-number display section 321, a reduction button 322, an increase button 323, and an initialization button 324. A stack number NS is displayed in the stack-number display section 321. The stack number NS indicates the number of superimposed images in the range of the images projected by the first projector group G1.

"2" displayed in the stack-number display section 321 indicates that the stack number NS is "2". In this case, the projectors 200 included in the image projection system 1 are configured by the projectors 200 included in the first projector group G1 and the projectors 200 included in the second projector group G2.

The projectors 200 included in the first projector group G1 project images in a first layer. The projectors 200 included in the second projector group G2 project images in a second layer superimposed on the images in the first layer.

The initialization button 324 is touched by the user when initializing the vertical direction number NV, the horizontal direction number NH, and the stack number NS. When the initialization button 324 is touched, the first display control section 113 resets the vertical direction number NV, the horizontal direction number NH, and the stack number NS to predetermined initial numbers and updates the displays in the vertical-direction-number display section 311, the horizontal-direction-number display section 314, and the stack-number display section 321 to predetermined initial values.

The image display section 330 displays image views of images projected by the projectors 200 included in the image projection system 1. In this embodiment, since the stack number NS is "2", a first layer image 331 and a second layer image 332 are displayed in the image display section 330. In each of the first layer image 331 and the second layer image 332, since the vertical direction number NV is "2", two rectangular images are arranged in the up-down direction DV. Since the horizontal direction number NH is "2", two rectangular images are arranged in the left-right direction DH. Each rectangular image indicates an image projected by one projector 200.

A list of the projectors 200 that can be set as the projectors 200 included in the first projector group G1 or the second projector group G2 is displayed in the list display section 340. For example, concerning each of the first projector 200A to the eighth projectors 200H, a name 341, an IP address 342, an image 343 indicating open and close of a shutter, and an image 344 indicating a function of the projector 200 are displayed. The list display section 340 corresponds to an example of a "first display region". Each of the name 341 and the IP address 342 corresponds to an example of "identification information".

For example, the name 341 of the first projector 200A is "emu1". The IP address 342 of the first projector 200A is "192.0.2.0". The image 343 of the first projector 200A indicates that a shutter of the first projector 200A is in an open state. The image 344 of the first projector 200A indicates that the first projector 200A has a screen matching function F1, a tiling assist function F2, and a stacking assist function F3.

For example, the name 341 of the second projector 200B is "emu2". The IP address 342 of the second projector 200B is "192.0.2.1". The image 343 of the second projector 200B indicates that a shutter of the second projector 200B is in an open state. The image 344 of the second projector 200B indicates that the second projector 200B has the screen matching function F1, the tiling assist function F2, and the stacking assist function F3.

The stacking assist function F3 is explained in detail below with reference to FIG. 6. The screen matching function F1 and the tiling assist function F2 are explained in detail below with reference to FIG. 7.

The name 341 and the IP address 342 of the first projector 200A displayed in void indicate that the first projector 200A is selected as the projector 200 included in the first projector group G1 or the second projector group G2.

The name 341 and the IP address 342 of the second projector 200B not displayed in void indicate that the second projector 200B is not selected as the projector 200 included in the first projector group G1 or the second projector group G2.

The first region 350 indicates a region for setting the positions of the images projected by the respective four projectors 200 included in the first projector group G1. The first region 350 includes a first small region 351, a second small region 352, a third small region 353, and a fourth small region 354.

In the first small region 351, the projector 200 that projects an image onto a left upper position in the range of the images projected by the first projector group G1 is virtually arranged. In the second small region 352, the projector 200 that projects an image onto an upper right position in the range of the images projected by the first projector group G1 is virtually arranged. In the third small region 353, the projector 200 that projects an image onto a lower left position in the range of the images projected by the first projector group G1 is virtually arranged. In the fourth small region 354, the projector 200 that projects an image onto a lower right position in the range of the images projected by the first projector group G1 is virtually arranged.

On the first setting screen 300 shown in FIG. 5, the first projector 200A is arranged in the third small region 353 of the first region 350. For example, the user performs operation for dragging and dropping the name 341 of the first projector 200A displayed in the list display section 340 to the third small region 353 of the first region 350, whereby the first projector 200A is arranged in the small region 353 of the first region 350.

Since the first projector 200A is arranged in the third small region 353 of the first region 350, the name 341, the IP address 342, and a model number of the first projector 200A are displayed in the third small region 353 of the first region 350. The model number of the first projector 200A is "PJ1000/PJ1002".

The second region 360 indicates a region for setting the positions of the images projected by the respective four projectors 200 included in the second projector group G2. The second region 360 includes a first small region 361, a second small region 362, a third small region 363, and a fourth small region 364.

In the first small region 361, the projector 200 that projects an image onto a left upper position in the range of the images projected by the second projector group G2 is virtually arranged. In the second small region 362, the projector 200 that projects an image onto an upper right position in the range of the images projected by the second projector group G2 is virtually arranged. In the third small region 363, the projector 200 that projects an image onto a lower left position in the range of the images projected by the second projector group G2 is virtually arranged. In the fourth small region 364, the projector 200 that projects an image onto a lower right position in the range of the images projected by the second projector group G2 is virtually arranged.

On the first setting screen 300 shown in FIG. 5, the projector 200 is not arranged in the second region 360.

The OK button 371 is touched by the user when determining the arrangement of the projectors 200 in the first region 350 and the second region 360. When the OK button 371 is touched, the first setting section 114 determines arrangement of the projectors 200 in the first region 350 and the second region 360 and transmits instruction information to the projectors 200 to instruct the projectors 200 to project images onto positions of the determined arrangement.

The cancel button 372 is touched by the user when cancelling the arrangement of the projectors 200 in the first region 350 and the second region 360. When the cancel button 372 is touched, the first setting section 114 cancels the arrangement of the projectors 200 in the first region 350 and the second region 360. The first display control section 113 returns the first region 350 and the second region 360 to a state in which the projectors 200 are not arranged in the first region 350 and the second region 360.

The first setting screen 300 shown in FIG. 6 is different from the first setting screen 300 shown in FIG. 5 in the list display section 340, the first region 350, the second region 360, and a second function display section 380.

Specifically, on the first setting screen 300 shown in FIG. 5, the first projector 200A is arranged in the third small region 353 of the first region 350 and the projectors 200 are not arranged in the first small region 351, the second small region 352, and the fourth small region 354 of the first region 350.

On the other hand, on the first setting screen 300 shown in FIG. 6, the second projector 200B is arranged in the first small region 351 of the first region 350, the third projector 200C is arranged in the second small region 352 of the first region 350, and the fourth projector 200D is arranged in the fourth small region 354 of the first region 350.

On the first setting screen 300 shown in FIG. 5, the projector 200 is not arranged in the second region 360.

On the other hand, on the first setting screen 300 shown in FIG. 6, the fifth projector 200E is arranged in the first small region 361 of the second region 360, the seventh projector 200G is arranged in the second small region 362, and the eighth projector 200H is arranged in the fourth small region 364.

On the first setting screen 300 shown in FIG. 5, in the list display section 340, the name 341 and the IP address 342 of the first projector 200A are displayed in void and the names 341 and the IP addresses 342 of the other projectors 200 are not displayed in void.

On the other hand, on the first setting screen 300 shown in FIG. 6, in the list display section 340, the name 341 and the IP address 342 of the sixth projector 200F are not displayed in void and the names 341 and the IP addresses 342 of the other projectors 200 are displayed in void.

That is, after the first setting screen 300 shown in FIG. 5 is displayed, operation for arranging the second projector 200B, which is displayed in the first list display section 340, in the first small region 351 of the first region 350, operation for arranging the third projector 200C, which is displayed in the first list display section 340, in the second small region 352 of the first region 350, and operation for arranging the fourth projector 200D, which is displayed in the first list display section 340, in the fourth small region 354 of the first region 350 are performed. Operation for arranging the fifth projector 200E, which is displayed in the list display section 340, in the first small region 361 of the second region 360, operation for arranging the seventh projector 200G, which is displayed in the list display section 340, in the second small region 352 of the second region 360, and operation for arranging the eighth projector 200H, which is displayed in the list display section 340, in the fourth small region 364 of the second region 360 are performed. As a result, the first setting screen 300 shown in FIG. 6 is displayed by the first display control section 113.

In the following explanation with reference to FIG. 6, a pointer PT is arranged in the first small region 361 included in the second projector group G2.

In the second function display section 380 shown in FIG. 6, a message indicating that second the projector 200B arranged in the first small region 351 included in the first projector group G1 and the fifth projector 200E arranged in the first small region 361 included in the second projector group G2 can execute the stacking assist function F3 is displayed.

Specifically, "S-1 You can execute stacking." is displayed in the second function display section 380. "S-1" is a group name given to the first small region 351 included in the first projector group G1 and the first small region 361 included in the second projector group G2.

The second function display section 380 corresponds to an example of a "third display region".

The stacking assist function F3 indicates a function of aligning positions of pixels forming an image projected by one projector 200 and positions of pixels forming an image projected by another one projector 200. The second projector 200B corresponds to an example of the one projector 200. The fifth projector 200E corresponds to an example of the other one projector 200.

That is, the second function display section 380 shown in FIG. 6 indicates that it is possible to execute the stacking assist function F3 for aligning positions of pixels forming an image projected by the second projector 200B and positions of pixels forming an image projected by the fifth projector 200E.

The first setting screen 300 shown in FIG. 7 is different from the first setting screen 300 shown in FIG. 6 in the list display section 340, the second region 360, a first function display section 390, and the second function display section 380.

On the first setting screen 300 shown in FIG. 6, the fifth projector 200E is arranged in the first small region 361 of the second region 360, the seventh projector 200G is arranged in the second small region 362 of the second region 360, and the eighth projector 200H is arranged in the fourth small region 364 of the second region 360. The projector 200 is not arranged in the third small region 363 of the second region 360.

On the other hand, on the first setting screen 300 shown in FIG. 7, the sixth projector 200F is arranged in the third small region 363 of the second region 360.

On the first setting screen 300 shown in FIG. 6, the name 341 and the IP address 342 of the sixth projector 200F are not displayed in void and the names 341 and the IP addresses 342 of the other projectors 200 are displayed in void.

On the other hand, on the first setting screen 300 shown in FIG. 7, the name 341 and the IP address 342 of the sixth projector 200F are displayed in void.

That is, after the first setting screen 300 shown in FIG. 6 is displayed, operation for arranging the sixth projector 200F, which is displayed in the list display section 340, in the third small region 363 of the second region 360 is performed. As a result, the first setting screen 300 shown in FIG. 7 is displayed by the first display control section 113.

In the following explanation with reference to FIG. 7, the pointer PT is arranged in the third small region 363 included in the second projector group G2.

In the first function display section 390 shown in FIG. 7, a message indicating that the four projectors 200 included in the second projector group G2 can execute the screen matching function F1 and the tiling assist function F2 is displayed.

The first function display section 390 corresponds to an example of a "second display region".

The screen matching function F1 indicates a function of adjusting a tint and brightness of images displayed adjacent to each other among images projected by the respective four projectors 200 included in the second projector group G2.

The tiling assist function F2 indicates a function of adjusting sizes and positions of the images projected by the respective four projectors 200 included in the second projector group G2.

In the second function display section 380 shown in FIG. 7, a message indicating that the first projector 200A arranged in the third small region 353 included in the first projector group G1 and the sixth projector 200F arranged in the third small region 363 included in the second projector group G2 can execute the stacking assist function F3 is displayed.

Specifically, "S-3 You can execute stacking." is displayed in the second function display section 380. "S-3" is a group name given to the third small region 353 included in the first projector group G1 and the third small region 363 included in the second projector group G2.

Figure 8:
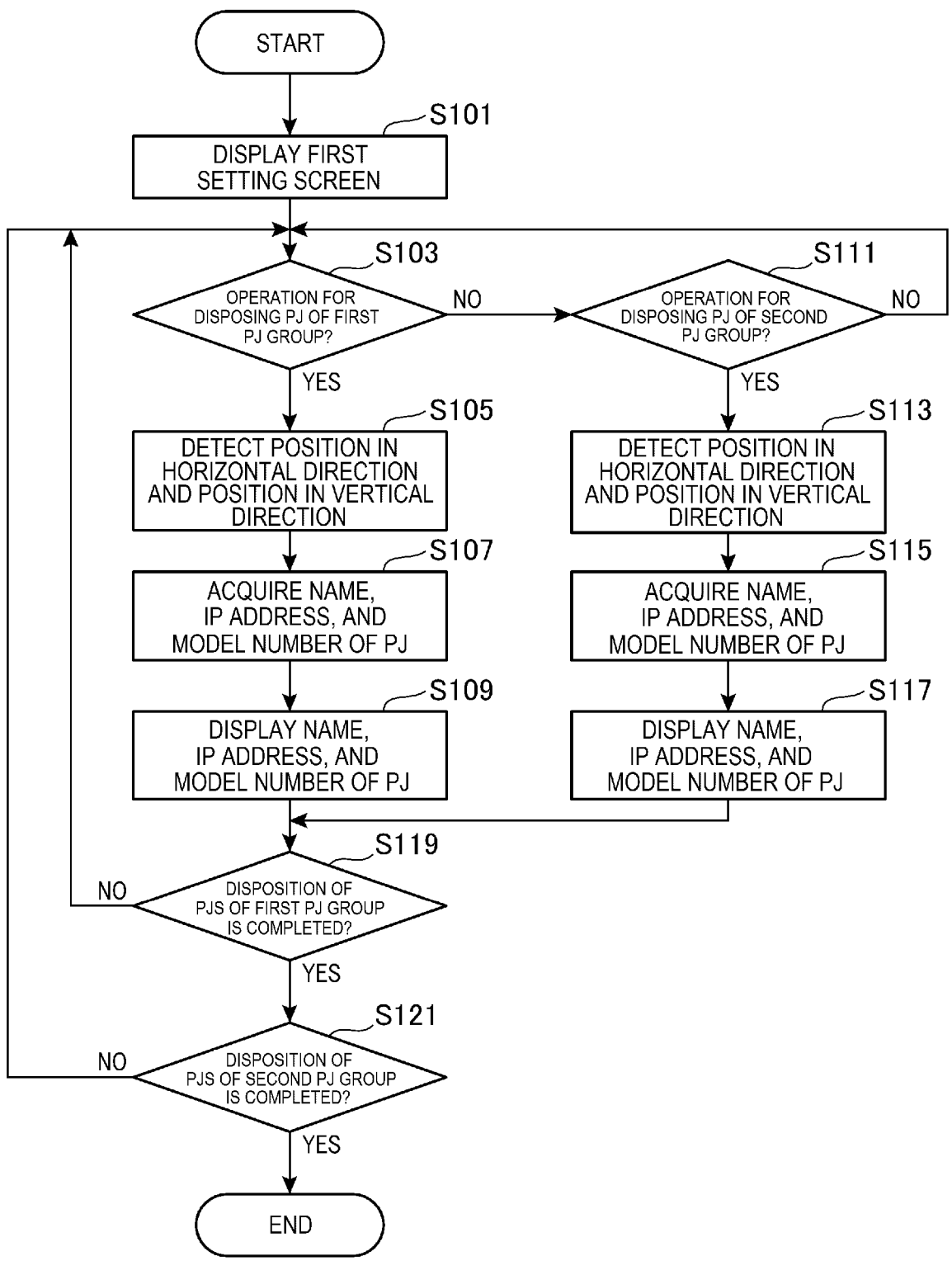
FIG. 8 is a flowchart showing an example of projector disposition processing by the first control section.

3. Processing by the First Control Section on the First Setting Screen 3-1. Projector Disposition Processing by the First Control Section FIG. 8 is a flowchart showing an example of "projector disposition processing" by the first control section 110. The "projector disposition processing" indicates processing for setting, from the projectors 200 displayed in the list display section 340, disposition of the four projectors 200 included in the first projector group G1 and the four projectors 200 included in the second projector group G2.

First, in step S101, the first display control section 113 displays the first setting screen 300 on the display panel 141.

Subsequently, in step S103, the first setting section 114 determines whether operation for disposing the projector 200 included in the first projector group G1 is received.

When the first setting section 114 determines that the operation for disposing the projector 200 included in the first projector group G1 is not received (NO in step S103), the processing proceeds to step S111. When the first setting section 114 determines that the operation for disposing the projector 200 included in the first projector group G1 is received (YES in step S103), the processing proceeds to step S105.

In step S105, the first setting section 114 detects, based on operation by the user on the first setting screen 300, a position in the horizontal direction and a position in the vertical direction where the projector 200 is disposed. Specifically, the first setting section 114 detects, based on a position where drop operation in drag-and-drop operation by the user is performed, a position in the horizontal direction and a position in the vertical direction where the projector 200 is disposed.

The horizontal direction corresponds to the left-right direction DH in FIGS. 5 to 7 and the vertical direction corresponds to the up-down direction DV in FIGS. 5 to 7.

Subsequently, in step S107, the first setting section 114 acquires the name 341, the IP address 342, and the model number of the projector 200 from the list display section 340. Specifically, the first setting section 114 determines one projector 200 from the list display section 340 based on a position where drag operation in the drag-and-drop operation by the user is started and acquires the name 341, the IP address 342, the model number of the projector 200.

Subsequently, in step S109, the first setting section 114 displays the name 341, the IP address 342, and the model number in a position where the projector 200 is disposed. The processing proceeds to step S119.

When the first setting section 114 determines that the operation for disposing the projector 200 included in the first projector group G1 is not received (NO in step S103), in step S111, the first setting section 114 determines whether operation for disposing the projector 200 included in the second projector group G2 is received.

When the first setting section 114 determines that the operation for disposing the projector 200 included in the second projector group G2 is not received (NO in step S111), the processing returns to step S103. When the first setting section 114 determines that the operation for disposing the projector 200 included in the second projector group G2 is received (YES in step S111), the processing proceeds to step S113.

In step S113, the first setting section 114 detects, based on operation by the user on the first setting screen 300, a position in the horizontal direction and a position in the vertical direction where the projector 200 is disposed. Specifically, the first setting section 114 detects, based on a position where the drop operation in the drag-and-drop operation by the user is performed, a position in the horizontal direction and a position in the vertical direction where the projector 200 is disposed.

Subsequently, in step S115, the first setting section 114 acquires the name 341, the IP address 342, and the model number of the projector 200 from the list display section 340. Specifically, the first setting section 114 determines one projector 200 from the list display section 340 based on a position where the drag operation in the drag-and-drop operation by the user is started and acquires the name 341, the IP address 342, and the model number of the projector 200.

Subsequently, in step S117, the first setting section 114 displays the name 341, the IP address 342, and the model number of the projector 200 in a position where the projector 200 is disposed. The processing proceeds to step S119.

Subsequently, in step S119, the first control section 110 determines whether the disposition of the four projectors 200 included in the first projector group G1 is completed.

When the first control section 110 determines that the disposition of the four projectors 200 included in the first projector group G1 is not completed (NO in step S119), the processing returns to step S103. When the first control section 110 determines that the disposition of the four projectors 200 included in the first projector group G1 is completed (YES in step S119), the processing proceeds to step S121.

In step S121, the first control section 110 determines whether the disposition of the four projectors 200 included in the second projector group G2 is completed.

When the first control section 110 determines that the disposition of the four projectors 200 included in the second projector group G2 is not completed (NO in step S121), the processing returns to step S103. When the first control section 110 determines that the disposition of the four projectors 200 included in the second projector group G2 is completed (YES in step S121), the processing ends.

3-2. Function Display Processing by the First Control Section

Figure 9:
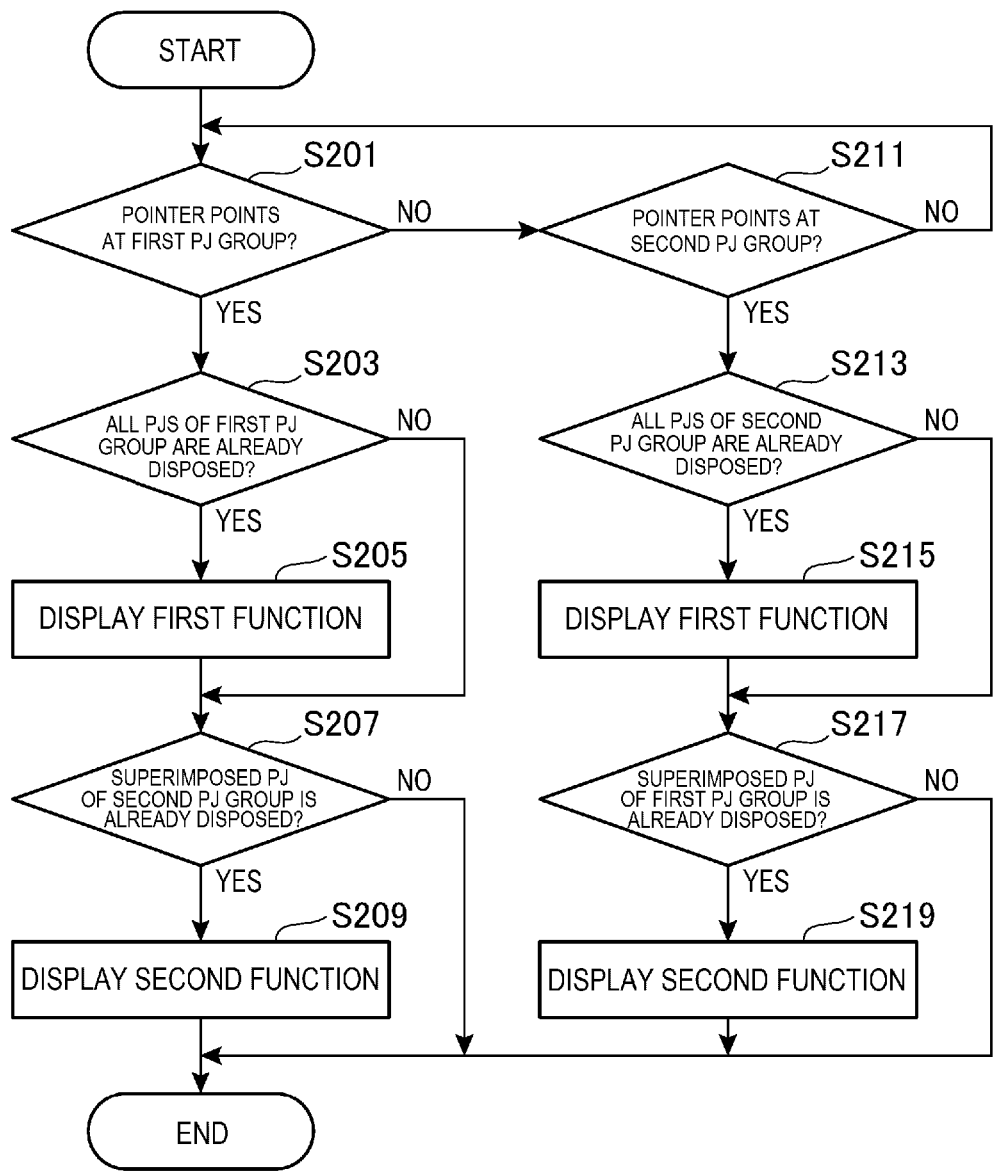
FIG. 9 is a flowchart showing an example of function display processing by the first control section.

FIG. 9 is a flowchart showing an example of "function display processing" by the first control section 110. The "function display processing" includes "first function display processing" and "second function display processing". The "first function display processing" indicates processing for displaying, in the first function display section 390 shown in FIG. 7, a first function executable by the four projectors 200 included in the first projector group G1 or the four projectors 200 included in the second projector group G2. The first function includes the screen matching function F1 and the tiling assist function F2.

The "second function display processing" indicates processing for displaying, in the second function display section 380 shown in FIG. 6, a second function executable by one projector 200 among the four projectors 200 included in the first projector group G1 and another projector 200, which projects an image over an image projected by the one projector 200, among the four projectors 200 included in the second projector group G2. The second function includes the stacking assist function F3.

As shown in FIG. 9, first, in step S201, the first display control section 113 determines whether the pointer PT points at the first projector group G1.

When the first display control section 113 determines that the pointer PT does not point at the first projector group G1 (NO in step S201), the processing proceeds to step S211. When the first display control section 113 determines that the pointer PT points at the first projector group G1 (YES in step S201), the processing proceeds to step S203.

In step S203, the first display control section 113 determines whether the respective four projectors 200 included in the first projector group G1 are already disposed.

When the first display control section 113 determines that at least one of the four projectors 200 included in the first projector group G1 is not disposed yet (NO in step S203), the processing proceeds to step S207. When the first display control section 113 determines that the respective four projectors 200 included in the first projector group G1 are already disposed (YES in step S203), the processing proceeds to step S205.

In step S205, the first display control section 113 displays, in the first function display section 390, a first function executable by the four projectors 200 included in the first projector group G1.

Subsequently, in step S207, the first display control section 113 determines whether another one projector 200 corresponding to one projector 200 pointed at by the pointer PT is already disposed. The one projector 200 is included in the first projector group G1 and the other one projector 200 is included in the second projector group G2. The other one projector 200 projects an image over an image projected by the one projector 200.

When the first display control section 113 determines that the other one projector 200 is not disposed yet (NO in step S207), the processing returns to step S201. When the first display control section 113 determines that the other one projector 200 is already disposed (YES in step S207), the processing proceeds to step S209.

In step S209, the first display control section 113 displays, in the second function display section 380, a second function executable by the one projector 200 included in the first projector group G1 and the other one projector 200 included in the second projector group G2. Thereafter, the processing returns to step S201.

In the case of NO in step S201, in step S211, the first display control section 113 determines whether the pointer PT points at the second projector group G2.

When the first display control section 113 determines that the pointer PT does not point at the second projector group G2 (NO in step S211), the processing returns to step S201. When the first display control section 113 determines that the pointer PT points at the second projector group G2 (YES in step S211), the processing proceeds to step S213.

In step S213, the first display control section 113 determines whether the respective four projectors 200 included in the second projector group G2 are already disposed.

When the first display control section 113 determines that at least one of the four projectors 200 included in the second projector group G2 is not disposed yet (NO in step S213), the processing proceeds to step S217. When the first display control section 113 determines that the respective four projectors 200 included in the first projector group G1 are already disposed (YES in step S213), the processing proceeds to step S215.

In step S215, the first display control section 113 displays, in the first function display section 390, a first function executable by the four projectors 200 included in the second projector group G2.

Subsequently, in step S217, the first display control section 113 determines whether another one projector 200 corresponding to one projector 200 pointed at by the pointer PT is already disposed. The one projector 200 is included in the second projector group G2 and the other one projector 200 is included in the first projector group G1. The other one projector 200 projects an image over an image projected by the one projector 200.

When the first display control section 113 determines that the other one projector 200 is not disposed yet (NO in step S217), the processing returns to step S201. When the first display control section 113 determines that the other one projector 200 is already disposed (YES in step S217), the processing proceeds to step S219.

In step S219, the first display control section 113 displays, in the second function display section 380, a second function executable by the one projector 200 included in the second projector group G2 and the other one projector 200 included in the first projector group G1. Thereafter, the processing returns to step S201.

4. Configuration of the Second Setting Screen

Figure 10:
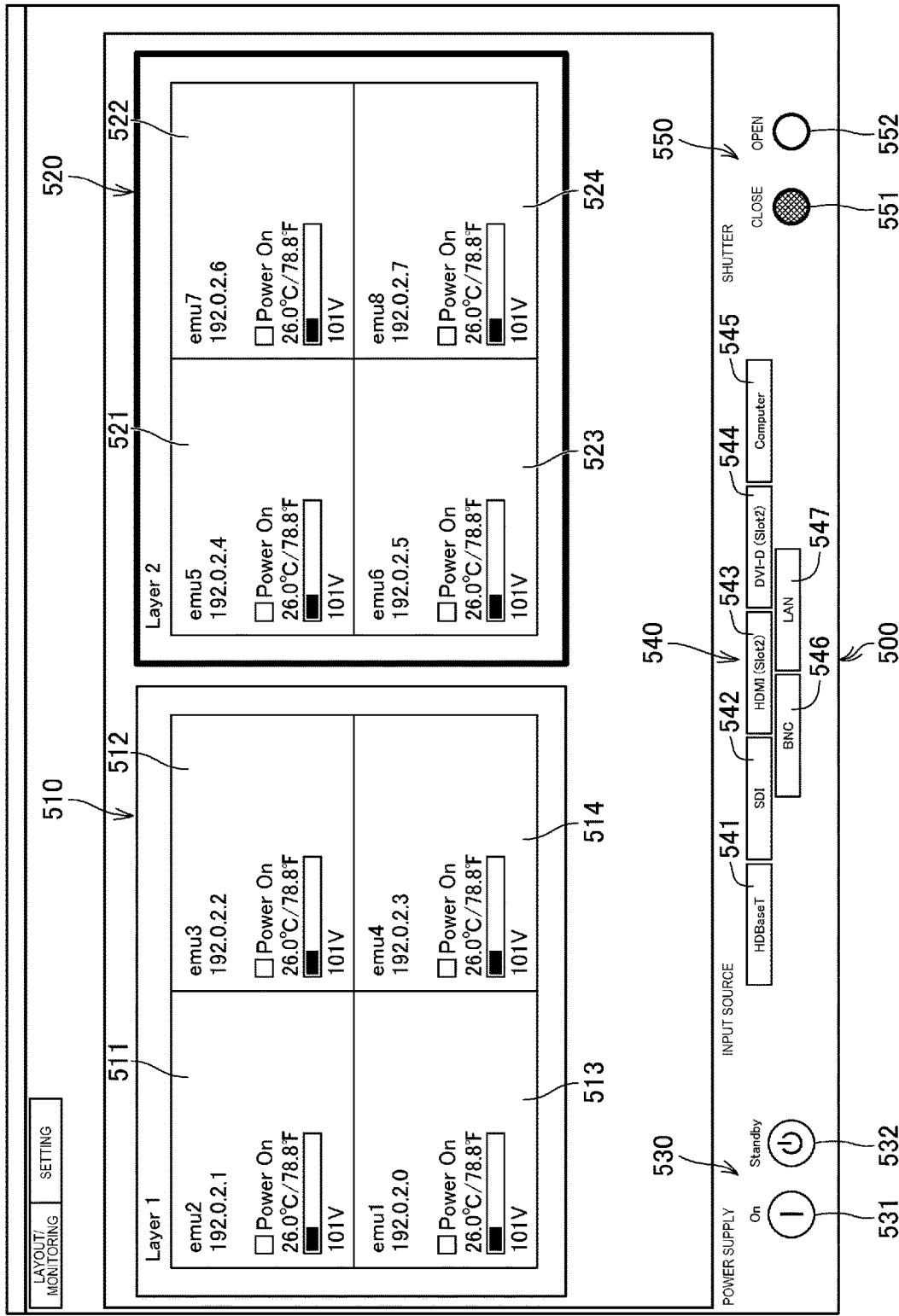
FIG. 10 is a screen diagram showing an example of a second setting screen displayed on the display panel.

FIG. 10 is a screen diagram showing an example of the second setting screen 500 displayed on the display panel 141.

A first group display region 510, a second group display region 520, a power button 530, an input terminal selection button 540, and a shutter operation button 550 are displayed on the second setting screen 500.

The first group display region 510 indicates a region for setting positions of images projected by the respective four projectors 200 included in the first projector group G1. The first group display region 510 includes a first small region 511, a second small region 512, a third small region 513, and a fourth small region 514.

In the first small region 511, the second projector 200B that projects an image onto an upper left position in the range of the images projected by the first projector group G1 is arranged. In the second small region 512, the third projector 200C that projects an image onto an upper right position in the range of the images projected by the first projector group G1 is arranged. In the third small region 513, the first projector 200A that projects an image onto a lower left position in the range of the images projected by the first projector group G1 is arranged. In the fourth small region 514, the fourth projector 200D that projects an image onto a lower right position in the range of the images projected by the first projector group G1 is arranged.

The names 341, the IP addresses 342, and the like of the second projector 200B, the third projector 200C, the first projector 200A, and the fourth projector 200D are respectively displayed in the first small region 511, the second small region 512, the third small region 513, and the fourth small region 514.

The second group display region 520 indicates a region for setting positions of images projected by the respective four projectors 200 included in the second projector group G2. The second group display region 520 includes a first small region 521, a second small region 522, a third small region 523, and a fourth small region 524.

In the first small region 521, the fifth projector 200E that projects an image onto an upper left position in the range of the images projected by the second projector group G2 is arranged. In the second small region 522, the seventh projector 200G that projects an image onto an upper right position in the range of the images projected by the second projector group G2 is arranged. In the third small region 523, the sixth projector 200F that projects an image onto a lower left position in the range of the images projected by the second projector group G2 is arranged. In the fourth small region 524, the eighth projector 200H that projects an image onto a lower right position in the range of the images projected by the second projector group G2 is arranged.

The names 341, the IP addresses 342, and the like of the fifth projector 200E, the seventh projector 200G, the sixth projector 200F, and the eighth projector 200H are respectively displayed in the first small region 521, the second small region 522, the third small region 523, and the fourth small region 524.

The power button 530 includes an ON button 531 and an OFF button 532. The ON button 531 is touched by the user when turning on power supplies of the four projectors 200 included in the first projector group G1 or the four projectors 200 included in the second projector group G2. The OFF button 532 is touched by the user when turning off the power supplies of the four projectors 200 included in the first projector group G1 or the four projectors 200 included in the second projector group G2.

The input terminal selection button 540 includes an HDBaseT button 541, an SDI button 542, an HDMI button 543, a DVI-D button 544, a computer button 545, a BNC button 546, and a LAN button 547.

The HDBaseT button 541 is touched by the user when setting input terminals of the four projectors 200 included in the first projector group G1 or the four projectors 200 included in the second projector group G2 to HDBaseT terminals.

The SDI button 542 is touched by the user when setting the input terminals of the four projectors 200 included in the first projector group G1 or the four projectors 200 included in the second projector group G2 to SDI terminals.

The HDMI button 543 is touched by the user when the input terminals of the four projectors 200 included in the first projector group G1 or the four projectors 200 included in the second projector group G2 as HDMI (registered trademark) terminals.

The DVI-D button 544 is touched by the user when the user sets the input terminals of the four projectors 200 included in the first projector group G1 or the four projectors 200 included in the second projector group G2 to DVI-D terminals.

The computer button 545 is touched by the user when setting the input terminals of the four projectors 200 included in the first projector group G1 or the four projectors 200 included in the second projector group G2 to terminals to which a computer is coupled. The terminals to which the computer is coupled are, for example, USB terminals.

The BNC button 546 is touched by the user when setting the input terminals of the four projectors 200 included in the first projector group G1 or the four projectors 200 included in the second projector group G2 to BNC terminals.

The LAN button 547 is touched by the user when setting the input terminals of the four projectors 200 included in the first projector group G1 or the four projectors 200 included in the second projector group G2 to terminals coupled to a LAN. The terminals coupled to the LAN are, for example, Ethernet (registered trademark) terminals.

The shutter operation button 550 includes a shutter close button 551 and a shutter open button 552.

The shutter close button 551 is touched by the user when closing shutters of the four projectors 200 included in the first projector group G1 or the four projectors 200 included in the second projector group G2.

The shutter open button 552 is touched by the user when opening the shutters of the four projectors 200 included in the first projector group G1 or the four projectors 200 included in the second projector group G2.

5. Processing by the First Control Section on the Second Setting Screen

Figure 11:
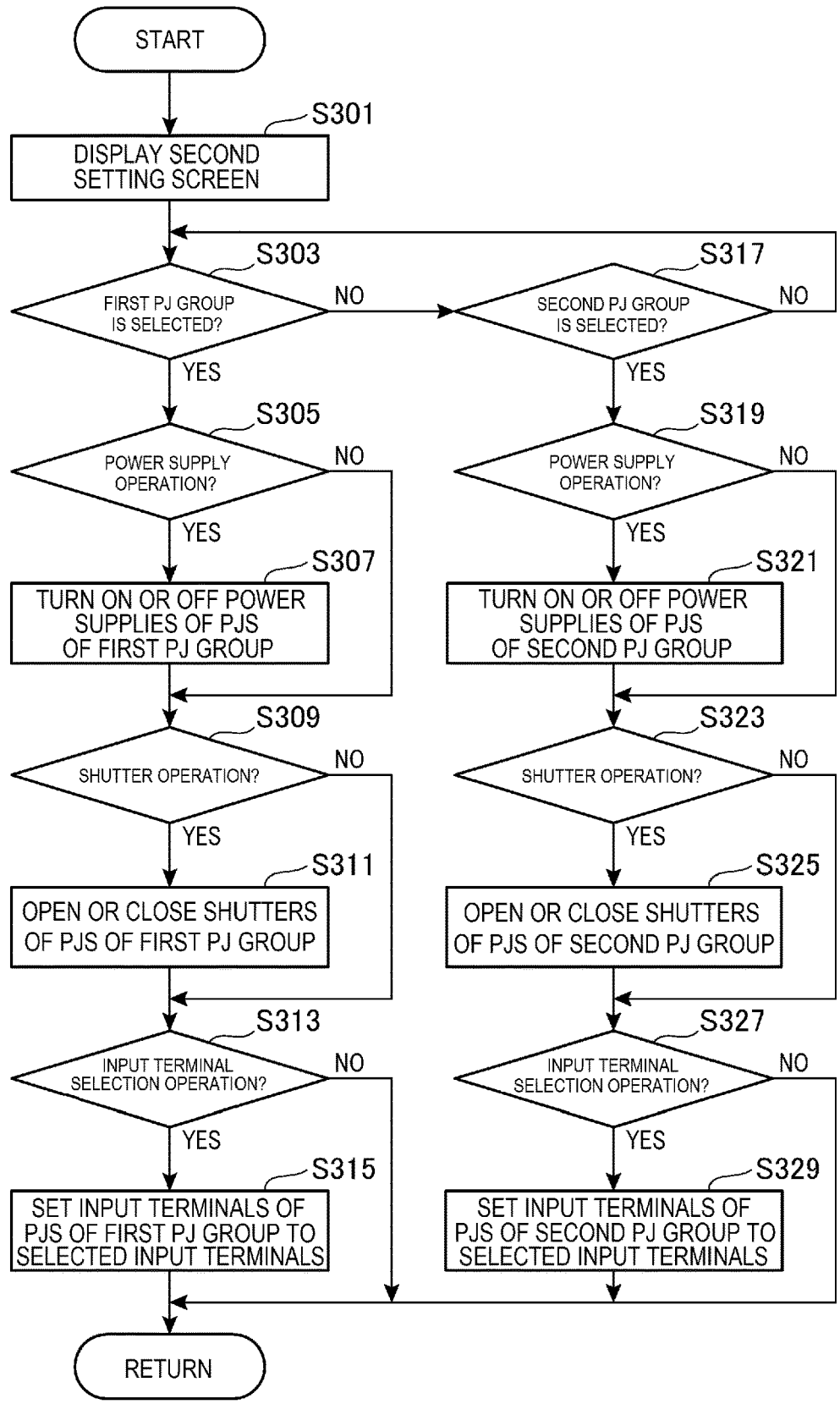
FIG. 11 is a flowchart showing an example of setting changing processing by the first control section.

FIG. 11 is a flowchart showing an example of "setting change processing" by the first control section 110. The "setting change processing" indicates processing for changing, based on user operation received via the second setting screen 500 shown in FIG. 10, setting for the four projectors 200 included in the first projector group G1 or the four projectors 200 included in the second projector group G2.

As shown in FIG. 11, first, in step S301, the second display control section 115 displays the second setting screen 500 on the display panel 141.

Subsequently, in step S303, the second setting section 116 determines whether the first projector group G1 is selected.

When the second setting section 116 determines that the first projector group G1 is not selected (NO in step S303), the processing proceeds to step S317. When the second setting section 116 determines that the first projector group G1 is selected (YES in step S303), the processing proceeds to step S305.

In step S305, the second setting section 116 determines whether power supply operation is received via the power button 530. The power supply operation corresponds to the second operation QP2.

When the second setting section 116 determines that the power supply operation is not received (NO in step S305), the processing proceeds to step S309. When the second setting section 116 determines that the power supply operation is received (YES in step S305), the processing proceeds to step S307.

In step S307, the second setting section 116 sets the power supplies of the four projectors 200 included in the first projector group G1 to ON or OFF.

Subsequently, in step S309, the second setting section 116 determines whether shutter operation is received via the shutter operation button 550. The shutter operation corresponds to the first operation QP1.

When the second setting section 116 determines that the shutter operation is not received (NO in step S309), the processing proceeds to step S313. When the second setting section 116 determines that the shutter operation is received (YES in step S309), the processing proceeds to step S311.

In step S311, the second setting section 116 opens or closes the shutters of the respective four projectors 200 included in the first projector group G1.

Subsequently, in step S313, the second setting section 116 determines whether input terminal selection operation is received via the input terminal selection button 540. The input terminal selection operation corresponds to the third operation QP3.

When the second setting section 116 determines that the input terminal selection operation is not received (NO in step S313), the processing returns to step S301. When the second setting section 116 determines that the input terminal selection operation is received (YES in step S313), the processing proceeds to step S315.

In step S315, the second setting section 116 sets the input terminals of the respective four projectors 200 included in the first projector group G1 to the selected terminals. The processing returns to step S301.

In the case of NO in step S303, in step S317, the second setting section 116 determines whether the second projector group G2 is selected.

When the second setting section 116 determines that the second projector group G2 is not selected (NO in step S317), the processing returns to step S303. When the second setting section 116 determines that the second projector group G2 is selected (YES in step S317), the processing proceeds to step S319.

In step S319, the second setting section 116 determines whether power supply operation is received via the power button 530. The power supply operation corresponds to the second operation QP2.

When the second setting section 116 determines that the power supply operation is not received (NO in step S319), the processing proceeds to step S323. When the second setting section 116 determines that the power supply operation is received (YES in step S319), the processing proceeds to step S321.

In step S321, the second setting section 116 sets the power supplies of the respective four projectors 200 included in the second projector group G2 to ON or OFF.

Subsequently, in step S323, the second setting section 116 determines whether shutter operation is received via the shutter operation button 550. The shutter operation corresponds to the first operation QP1.

When the second setting section 116 determines that the shutter operation is not received (NO in step S323), the processing proceeds to step S327. When the second setting section 116 determines that the shutter operation is received (YES in step S323), the processing proceeds to step S325.

In step S325, the second setting section 116 opens or closes the shutters of the respective four projectors 200 included in the second projector group G2.

Subsequently, in step S327, the second setting section 116 determines whether input terminal selection operation is received via the input terminal selection button 540. The input terminal selection operation corresponds to the third operation QP3.

When the second setting section 116 determines that the input terminal selection operation is not received (NO in step S327), the processing returns to step S301. When the second setting section 116 determines that the input terminal selection operation is received (YES in step S327), the processing proceeds to step S329.

In step S329, the second setting section 116 sets the input terminals of the respective four projectors 200 included in the second projector group G2 to the selected terminals. The processing returns to step S301.

In the above explanation in this embodiment, the four projectors 200 included in the first projector group G1 are grouped and the four projectors 200 included in the second projector group G2 are grouped. However, embodiments of the present disclosure are not limited to this. At least two of the four projectors 200 included in the first projector group G1 and the four projectors 200 included in the second projector group G2 only have to be grouped. For example, the second projector 200B included in the first projector group G1 and the fifth projector 200E included in the second projector group G2 may be grouped. For example, the four projectors 200 included in the first projector group G1 and the four projectors 200 included in the second projector group G2 may be grouped into one group.

6. This Embodiment and Action Effects

As explained above with reference to FIGS. 1 to 11, the control method for the image projection system 1 according to this embodiment is a control method for the image projection system 1 including the first projector group G1 and the second projector group G2, a range of images projected by the first projector group G1 and a range of images projected by the second projector group G2 being set to coincide with each other, the control method for the image projection system 1 including: displaying the first setting screen 300 including the first region 350 for setting positions of images projected by the respective four projectors 200 included in the first projector group G1 and the second region 360 for setting positions of images projected by the respective four projectors 200 included in the second projector group G2; and receiving operation by a user on the first setting screen 300 and setting the positions of the images projected by the respective four projectors 200 included in the first projector group G1 and the positions of the images projected by the respective four projectors 200 included in the second projector group G2.

Accordingly, it is possible to receive the operation by the user on the first setting screen 300 and set the positions of the images projected by the respective four projectors 200 included in the first projector group G1 and the positions of the images projected by the respective four projectors 200 included in the second projector group G2. Therefore, it is possible to easily set the positions of the images projected by the respective four projectors 200 included in the first projector group G1 and the positions of the images projected by the respective four projectors 200 included in the second projector group G2.

The first setting screen 300 includes the list display section 340 for displaying the names 341 indicating the respective communicably coupled plurality of projectors 200, and the control method for the image projection system 1 further includes receiving operation by the user on the list display section 340 and selecting, from the plurality of projectors 200 displayed in the list display section 340, the respective four projectors 200 included in the first projector group G1 and the respective four projectors 200 included in the second projector group G2.

Accordingly, it is possible to receive operation by the user on the list display section 340 and select, from the plurality of projectors 200 displayed in the list display section 340, the respective four projectors 200 included in the first projector group G1 and the respective four projectors 200 included in the second projector group G2. Therefore, it is possible to easily set the positions of the images projected by the respective four projectors 200 included in the first projector group G1 and the positions of the images projected by the respective four projectors 200 included in the second projector group G2.

The first setting screen 300 includes the first function display section 390 for displaying a first function executable by the four projectors 200 included in the first projector group G1 and displaying the first function executable by the four projectors 200 included in the second projector group G2.

Accordingly, it is possible to display, in the first function displaying section 390, the first function executable by the four projectors 200 included in the first projector group G1 and the first function executable by the four projectors 200 included in the second projector group G2. Therefore, the user can confirm the first function executable by the four projectors 200 included in the first projector group G1 and the first function executable by the four projectors 200 included in the second projector group G2. As a result, it is possible to improve convenience of the user.

The first function includes at least one of the screen matching function F1 and the tiling assist function F2, the screen matching function F1 indicates a function of adjusting a tint and brightness of images displayed adjacent to each other among images projected by the respective four projectors 200 included in the first projector group G1 or the second projector group G2, and the tiling assist function F2 indicates a function of adjusting sizes and positions of the images projected by the respective four projectors 200 included in the first projector group G1 or the second projector group G2.

Accordingly, the user can confirm at least one of the screen matching function F1 and the tiling assist function F2 as the first function. Therefore, it is possible to improve convenience of the user.

The first setting screen 300 includes the second function display section 380 for displaying a second function executable by one projector 200 among the four projectors 200 included in the first projector group G1 and another one projector 200, which projects an image over an image projected by the one projector 200, among the four projectors 200 included in the second projector group G2.

Accordingly, it is possible to display, in the second function display section 380, the second function executable by one projector 200 in the first projector group G1 and another one projector 200, which projects an image over an image projected by the one projector 200, in the second projector group G2. Therefore, the user can confirm the second function executable by two projectors 200 that project images superimposed each other. As a result, it is possible to improve convenience of the user.

The second function includes the stacking assist function F3, and the stacking assist function F3 indicates a function of aligning positions of pixels forming the image projected by the one projector 200 and positions of pixels forming the image projected by the other one projector 200.

Accordingly, the user can confirm the stacking assist function F3 as the second function. Therefore, it is possible to improve convenience of the user.

The control method for the image projection system 1 further includes displaying the second setting screen 500 for receiving, for the four projectors 200 included in the first projector group G1 or the four projectors 200 included in the second projector group G2, at least one operation among operation for opening or closing a shutter, operation for turning on and off a power supply, and operation for selecting one input terminal from a plurality of input terminals.

Accordingly, the user can instruct, via the second setting screen 500, for the four projectors 200 included in the first projector group G1 or the four projectors 200 included in the second projector group G2, at least one operation among the operation for opening or closing a shutter, the operation for turning on and off a power supply, and the operation for selecting one input terminal from a plurality of input terminals. Therefore, it is possible to improve convenience of the user.

The image projection system 1 according to this embodiment is the image projection system 1 including the first projector group G1 and the second projector group G2, a range of images projected by the first projector group G1 and a range of images projected by the second projector group G2 being set to coincide with each other, the image projection system 1 including: the first display control section 113 configured to display the first setting screen 300 including the first region 350 for setting positions of images projected by the respective four projectors 200 included in the first projector group G1 and the second region 360 for setting positions of images projected by the respective four projectors 200 included in the second projector group G2; and the first setting section 114 configured to receive operation by a user on the first setting screen 300 and set the positions of the images projected by the respective four projectors 200 included in the first projector group G1 and the positions of the images projected by the respective four projectors 200 included in the second projector group G2.

Accordingly, it is possible to receive the operation by the user on the first setting screen 300 and set the positions of the images projected by the respective four projectors 200 included in the first projector group G1 and the positions of the images projected by the respective four projectors 200 included in the second projector group G2. Therefore, it is possible to easily set the positions of the images projected by the respective four projectors 200 included in the first projector group G1 and the positions of the images projected by the respective four projectors 200 included in the second projector group G2.

7. Other Embodiments

This embodiment explained above is a preferred embodiment. However, the embodiments of the present disclosure are not limited to the embodiment explained above. Various modified implementations are possible without departing from the gist of the present disclosure.

In this embodiment, each of the first projector group G1 and the second projector group G2 includes the four projectors 200. However, the embodiments of the present disclosure are not limited to this. Each of the first projector group G1 and the second projector group G2 only has to include two or more projectors 200. For example, each the first projector group G1 and the second projector group G2 may include two projectors 200, may include three projectors 200, or may include five or more projectors 200.

In this embodiment, the first control section 110 of the control device 100 includes the first display control section 113 and the first setting section 114. However, the embodiments of the present disclosure are not limited to this. Any one of the four projectors 200 included in the first projector group G1 or any one of the four projectors 200 included in the second projector group G2 may include the first display control section 113 and the first setting section 114. In this case, the first setting screen 300 is projected and displayed on the screen SC.

In the above explanation in this embodiment, the control device 100 is configured by the personal computer. However, the embodiments of the present disclosure are not limited to this. The control device 100 may be configured by, for example, a tablet terminal, a smartphone, a PDA (Personal Digital Assistant), or the like.

In the above explanation in this embodiment, the control device 100 is communicably coupled to the projectors 200 by the LAN. However, the embodiments of the present disclosure are not limited to this. The control device 100 may be communicably coupled to the projectors 200 by wireless communication such as Wi-Fi (registered trademark).

The functional sections shown in FIGS. 2, 3, and 4 indicate functional components. Specific implementation forms are not particularly limited. That is, hardware individually corresponding to the functional sections does not always need to be implemented. It is also naturally possible to adopt a configuration in which one processor executes programs to realize functions of a plurality of functional sections. Apart of the functions realized by software in the embodiment may be realized by hardware or a part of the functions realized by hardware in the embodiment may be realized by software. Besides, specific detailed configurations of the other sections of the control device 100 can also be optionally changed without departing from the gist of the present disclosure.

The processing units of the flowcharts in FIGS. 8, 9, and 11 are divided according to the main processing contents in order to facilitate understanding of the processing by the control device 100. The processing units are not limited to ways of division and names of the processing units of the flowcharts in FIGS. 8, 9, and 11 and, according to the processing contents, can be divided into a larger number of processing units or can be divided such that one processing unit includes a larger number of kinds of processing. The processing orders of the flowcharts are not limited to the illustrated examples.

A control method of the control device 100 can be realized by causing the first processor 111 included in the control device 100 to execute the first control program corresponding to the control method of the control device 100. The first control program can also be recorded in a computer-readable recording medium. As the recording medium, a magnetic or optical recording medium or a semiconductor memory device can be used. Specifically, examples of the recording medium include portable or stationary recording media such as a flexible disk, a HDD, a CD-ROM (Compact Disk Read Only Memory), a DVD, a Blu-ray (registered trademark) Disc, a magneto-optical disk, a flash memory, and a card-type recording medium. The recording medium may be a nonvolatile storage device such as a RAM, a ROM, or a HDD, which is an internal storage device included in an image processing device. The control method of the control device 100 can also be realized by storing the first control program corresponding to the control method of the control device 100 in a server device or the like and downloading the first control program from the server device to the control device 100.

What is claimed is:

1. A control method for an image projection system including a first projector group and a second projector group,
    a range of images projected by the first projector group and a range of images projected by the second projector group being set to coincide with each other,
    the control method for the image projection system comprising:
        displaying a first setting screen including a first region for setting positions of images projected by a respective plurality of projectors included in the first projector group and a second region for setting positions of images projected by a respective plurality of projectors included in the second projector group; and
        receiving operation by a user on the first setting screen and setting the positions of the images projected by the respective plurality of projectors included in the first projector group and the positions of the images projected by the respective plurality of projectors included in the second projector group;
    wherein the first setting screen includes a first display region for displaying identification information indicating a respective communicably coupled plurality of projectors, and
    the control method for the image projection system further comprises receiving operation by the user on the first display region and selecting, from the plurality of projectors displayed in the first display region, the respective plurality of projectors included in the first projector group and the respective plurality of projectors included in the second projector group.

2. The control method for an image projection system according to claim 1, wherein the first setting screen includes a second display region for displaying a first function executable by the plurality of projectors included in the first projector group and displaying the first function executable by the plurality of projectors included in the second projector group.

3. The control method for an image projection system according to claim 1, wherein
    the first function includes at least one of a screen matching function and a tiling assist function,
    the screen matching function indicates a function of adjusting a tint and brightness of images displayed adjacent to each other among images projected by the respective plurality of projectors included in the first projector group or the second projector group, and
    the tiling assist function indicates a function of adjusting sizes and positions of the images projected by the respective plurality of projectors included in the first projector group or the second projector group.

4. The control method for an image projection system according to claim 1, wherein the first setting screen includes a third display region for displaying a second function executable by one projector among the plurality of projectors included in the first projector group and another one projector, which projects an image over an image projected by the one projector, among the plurality of projectors included in the second projector group.

5. The control method for an image projection system according to claim 4, wherein
    the second function includes a stacking assist function, and
    the stacking assist function indicates a function of aligning positions of pixels forming the image projected by the one projector and positions of pixels forming the image projected by the other one projector.

6. The control method for an image projection system according to claim 1, further comprising displaying a second setting screen for receiving, for the plurality of projectors included in the first projector group or the plurality of projectors included in the second projector group, at least one operation among operation for opening or closing a shutter, operation for turning on and off a power supply, and operation for selecting one input terminal from a plurality of input terminals.

7. An image projection system including a first projector group and a second projector group,
    a range of images projected by the first projector group and a range of images projected by the second projector group being set to coincide with each other,
    the image projection system comprising one or more processors programmed for:
        displaying a first setting screen including a first region for setting positions of images projected by a respective plurality of projectors included in the first projector group and a second region for setting positions of images projected by a respective plurality of projectors included in the second projector group,
        receiving operation by a user on the first setting screen and set the positions of the images projected by the respective plurality of projectors included in the first projector group and the positions of the images projected by the respective plurality of projectors included in the second projector group,
        including with the first setting screen a first display region for displaying identification information indicating a respective communicably coupled plurality of projectors, and receiving operation by the user on the first display region and selecting, from the plurality of projectors displayed in the first display region, the respective plurality of projectors included in the first projector group and the respective plurality of projectors included in the second projector group.

8. The image projection system according to claim 7, wherein the one or more processors are further programmed for the first setting screen further including a second display region for displaying a first function executable by the plurality of projectors included in the first projector group and displaying the first function executable by the plurality of projectors included in the second projector group.

9. The image projection system according to claim 8, wherein the one or more processors are further programmed for:
the first function including at least one of a screen matching function and a tiling assist function,
the screen matching function indicating a function of adjusting a tint and brightness of images displayed adjacent to each other among images projected by the respective plurality of projectors included in the first projector group or the second projector group, and
the tiling assist function indicating a function of adjusting sizes and positions of the images projected by the respective plurality of projectors included in the first projector group or the second projector group.

10. The image projection system according to claim 7, wherein the one or more processors are further programmed for the first setting screen further including a third display region for displaying a second function executable by one projector among the plurality of projectors included in the first projector group and another one projector, which projects an image over an image projected by the one projector, among the plurality of projectors included in the second projector group.

11. The image projection system according to claim 10, wherein the one or more processors are further programmed for:
the second function including a stacking assist function, and
the stacking assist function indicating a function of aligning positions of pixels forming the image projected by the one projector and positions of pixels forming the image projected by the other one projector.

12. The image projection system according to claim 7, wherein the one or more processors are further programmed for further displaying a second setting screen for receiving, for the plurality of projectors included in the first projector group or the plurality of projectors included in the second projector group, at least one operation among operation for opening or closing a shutter, operation for turning on and off a power supply, and operation for selecting one input terminal from a plurality of input terminals.

13. A control method for an image projection system including a first projector group and a second projector group,
images projected by the first projector group form a first layer of an image by tiling projection by a plurality of first projectors included in the first projector group,
images projected by the second projector group form a second layer of the image by tiling projection by a plurality of second projectors included in the second projector group, and
the first layer of the image and the second layer of the image are overlapped to coincide with each other by stacking projection by the first projector group and the second projector group,
the control method for the image projection system comprising:
displaying a first setting screen including
a first region for setting positions of images projected by the respective plurality of first projectors, and
a second region for setting positions of images projected by the respective plurality of second projectors;
receiving operation by a user on the first setting screen; and
setting the positions of the images projected by the respective plurality of first projectors and the positions of the images projected by the respective plurality of second projector.

14. The control method for an image projection system according to claim 13, wherein the first setting screen includes a second display region for displaying a first function executable by the plurality of projectors included in the first projector group and displaying the first function executable by the plurality of projectors included in the second projector group.

15. The control method for an image projection system according to claim 14, wherein
the first function includes at least one of a screen matching function and a tiling assist function,
the screen matching function indicates a function of adjusting a tint and brightness of images displayed adjacent to each other among images projected by the respective plurality of projectors included in the first projector group or the second projector group, and
the tiling assist function indicates a function of adjusting sizes and positions of the images projected by the respective plurality of projectors included in the first projector group or the second projector group.

16. The control method for an image projection system according to claim 13, wherein the first setting screen includes a third display region for displaying a second function executable by one projector among the plurality of projectors included in the first projector group and another one projector, which projects an image over an image projected by the one projector, among the plurality of projectors included in the second projector group.

17. The control method for an image projection system according to claim 16, wherein
the second function includes a stacking assist function, and
the stacking assist function indicates a function of aligning positions of pixels forming the image projected by the one projector and positions of pixels forming the image projected by the other one projector.

18. The control method for an image projection system according to claim 13, further comprising displaying a second setting screen for receiving, for the plurality of projectors included in the first projector group or the plurality of projectors included in the second projector group, at least one operation among operation for opening or closing a shutter, operation for turning on and off a power supply, and operation for selecting one input terminal from a plurality of input terminals.

* * * * *